United States Patent
Nault et al.

(10) Patent No.: US 7,029,195 B2
(45) Date of Patent: Apr. 18, 2006

(54) COUPLER FOR CABLE TROUGH

(75) Inventors: Gary F. Nault, Bloomington, MN (US); Timothy J. Haataja, Prior Lake, MN (US); Matthew D. Ferris, Carver, MN (US); Alex Watts, Chapel Hill, NC (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 0 days.

(21) Appl. No.: 10/777,669

(22) Filed: Feb. 12, 2004

(65) Prior Publication Data

US 2004/0159749 A1    Aug. 19, 2004

Related U.S. Application Data

(60) Division of application No. 10/330,590, filed on Dec. 27, 2002, now Pat. No. 6,715,719, which is a continuation-in-part of application No. 10/107,547, filed on Mar. 27, 2002.

(51) Int. Cl.
F16L 3/22   (2006.01)

(52) U.S. Cl. ............... 403/293; 52/220.5; 248/68.1; 403/122; 403/387

(58) Field of Classification Search ............... 248/68.1, 248/49, 65, 53, 74.2; 403/293, 387, 325; 385/134
See application file for complete search history.

(56) References Cited

U.S. PATENT DOCUMENTS

| | | | |
|---|---|---|---|
| 2,316,166 A | 4/1943 | Huguelet | |
| 2,741,499 A | 4/1956 | Kussmaul | |
| 2,821,154 A | 1/1958 | Tennison, Jr. | |
| 2,823,056 A | 2/1958 | DiMeo et al. | |
| 2,834,622 A | 5/1958 | Reeves | |
| 2,891,750 A | 6/1959 | Bergquist | |
| 3,022,972 A | 2/1962 | Bunston | |
| 3,042,351 A | 7/1962 | Du Bois | |
| 3,188,030 A | 6/1965 | Fischer | |
| 3,351,699 A | 11/1967 | Merckle | |
| 3,370,121 A | 2/1968 | Merckle | |

(Continued)

FOREIGN PATENT DOCUMENTS

DE   3636412 A1   4/1988

(Continued)

OTHER PUBLICATIONS

Exhibit A, DITEL, Inc.; DITEL UPL-1000/UPT-1000/Corner Cable Guides; product information, 2 pages, © 1986.

(Continued)

*Primary Examiner*—Anita King
*Assistant Examiner*—Tan Le
(74) *Attorney, Agent, or Firm*—Merchant & Gould PC

(57) ABSTRACT

Couplers for a cable trough system including a terminal end sized to receive a terminal end of a trough member along a longitudinal direction of the body. A spring may be coupled to the body for securing the terminal end of the trough member to the coupler, the spring including first and second spring arms extending generally in opposition to one another in a plane generally parallel to the longitudinal direction. The spring may be received in a slot formed by the trough member. Also included may be a spring release mechanism coupled to the body, the spring release mechanism sliding in the longitudinal direction between a locked position, such that the first and second spring arms engage the terminal end of the trough, and an unlocked position, such that the first and second fingers release the first and second arms of the spring.

14 Claims, 29 Drawing Sheets

U.S. PATENT DOCUMENTS

| | | |
|---|---|---|
| 3,457,598 A | 7/1969 | Mariani |
| 3,471,629 A | 10/1969 | O'Leary |
| 3,603,625 A | 9/1971 | Cottrell et al. |
| 3,782,420 A | 1/1974 | Kolb et al. |
| 3,875,618 A | 4/1975 | Schuplin |
| 3,915,420 A | 10/1975 | Norris |
| 4,099,749 A | 7/1978 | van Vliet |
| 4,305,236 A | 12/1981 | Williams |
| 4,854,665 A | 8/1989 | Gagnon |
| 4,954,015 A | 9/1990 | McGowan |
| 5,035,092 A | 7/1991 | Brant |
| 5,038,528 A | 8/1991 | Brant |
| 5,067,678 A | 11/1991 | Henneberger et al. |
| 5,100,221 A | 3/1992 | Carney et al. |
| 5,134,250 A | 7/1992 | Caveney et al. |
| 5,142,606 A | 8/1992 | Carney et al. |
| 5,161,580 A | 11/1992 | Klug |
| 5,316,243 A | 5/1994 | Henneberger |
| D348,651 S | 7/1994 | Henneberger |
| 5,469,893 A | 11/1995 | Caveney et al. |
| 5,547,307 A | 8/1996 | Decore et al. |
| 5,617,678 A | 4/1997 | Morandin et al. |
| 5,720,567 A | 2/1998 | Rinderer |
| 5,752,781 A | 5/1998 | Haataja et al. |
| 5,753,855 A | 5/1998 | Nicoli et al. |
| 5,792,993 A | 8/1998 | Rinderer |
| D402,262 S | 12/1998 | Scherer et al. |
| D402,263 S | 12/1998 | Scherer et al. |
| D413,306 S | 8/1999 | Scherer et al. |
| 5,995,699 A | 11/1999 | Vargas et al. |
| 5,998,732 A | 12/1999 | Caveney et al. |
| D419,962 S | 2/2000 | Caveney |
| 6,037,543 A | 3/2000 | Nicoli et al. |
| D430,543 S | 9/2000 | Rohder |
| 6,126,122 A | 10/2000 | Ismert |
| 6,143,984 A | 11/2000 | Auteri |
| 6,188,024 B1 | 2/2001 | Benito-Navazo |
| 6,193,434 B1 | 2/2001 | Durin et al. |
| D447,737 S | 9/2001 | Scherer et al. |
| 6,402,418 B1 | 6/2002 | Durin et al. |
| 6,424,779 B1 | 7/2002 | Ellison et al. |
| 6,450,458 B1 | 9/2002 | Bernard |
| 6,463,631 B1 | 10/2002 | Noda |
| 6,476,327 B1 | 11/2002 | Bernard et al. |
| 6,512,875 B1 | 1/2003 | Johnson et al. |
| 6,523,791 B1 | 2/2003 | Bernard et al. |
| 6,634,605 B1 | 10/2003 | Bernard et al. |
| 6,709,186 B1 | 3/2004 | Ferris et al. |
| 6,810,191 B1 * | 10/2004 | Ferris et al. ............ 385/134 |
| 2002/0006312 A1 | 1/2002 | Buard |
| 2002/0096606 A1 | 7/2002 | Bernard et al. |
| 2003/0183731 A1 | 10/2003 | Ferris et al. |
| 2003/0183732 A1 | 10/2003 | Nault et al. |
| 2004/0159750 A1 | 8/2004 | Ferris et al. |

FOREIGN PATENT DOCUMENTS

| | | |
|---|---|---|
| DE | 102 12 285 A1 | 11/2002 |
| EP | 0 315 023 A2 | 5/1989 |
| EP | 0 571 307 A1 | 11/1993 |
| EP | 0 486 442 B1 | 10/1995 |
| EP | 0 84 260 A1 | 10/1998 |
| EP | 1 033 800 A1 | 9/2000 |
| EP | 1 160 949 A2 | 12/2001 |
| EP | 1 160 950 A2 | 12/2001 |
| EP | 1 249 912 A1 | 10/2002 |
| FR | 1479341 | 5/1967 |
| GB | 548840 | 12/1942 |
| GB | 1 342 085 | 12/1973 |
| WO | 99/06746 | 2/1999 |
| WO | 00/75550 | 12/2000 |
| WO | 02/18991 | 3/2002 |
| WO | 02/31939 | 4/2002 |
| WO | 02/33445 | 4/2002 |
| WO | WO 02/086576 A1 | 10/2002 |

OTHER PUBLICATIONS

Exhibit B, ADC Telecommunications, Inc.; FiberGuide™, Fiber Management System, 6 pages front and back printed.

Exhibit C, Warren & Brown Technologies Pty. Ltd., Fibre Optic Management Systems, Component Selection Guide, 19 pages of product information. Source: www.warrenandbrown.com:au.

Exhibit D, Panduit Network Connectivity Group, FiberRunner™ 6x4 Routing Sustem Product Brochure, 2 pages, © Panduit Corp. 2000.

Exhibit E, Panduit Corp. FiberRunner™ 4x4 Quiklock™ Coupler (FRBC4x4) Customer Drawing, 1 page, Jul. 13, 2001.

Exhibit F, Panduit Corp. FiberRunner™ 6x4 Quiklock™ Coupler (FRBC6x4) Customer Drawing, 1 page, May 10, 2000.

Exhibit G, Panduit Corp. FiberRunner™ 12x4 Quiklock™ Coupler (FRBC12x4) Customer Drawing, 1 page, Jan. 3, 2001.

Exhibit H-M, Photographs of various Panduit products.

* cited by examiner

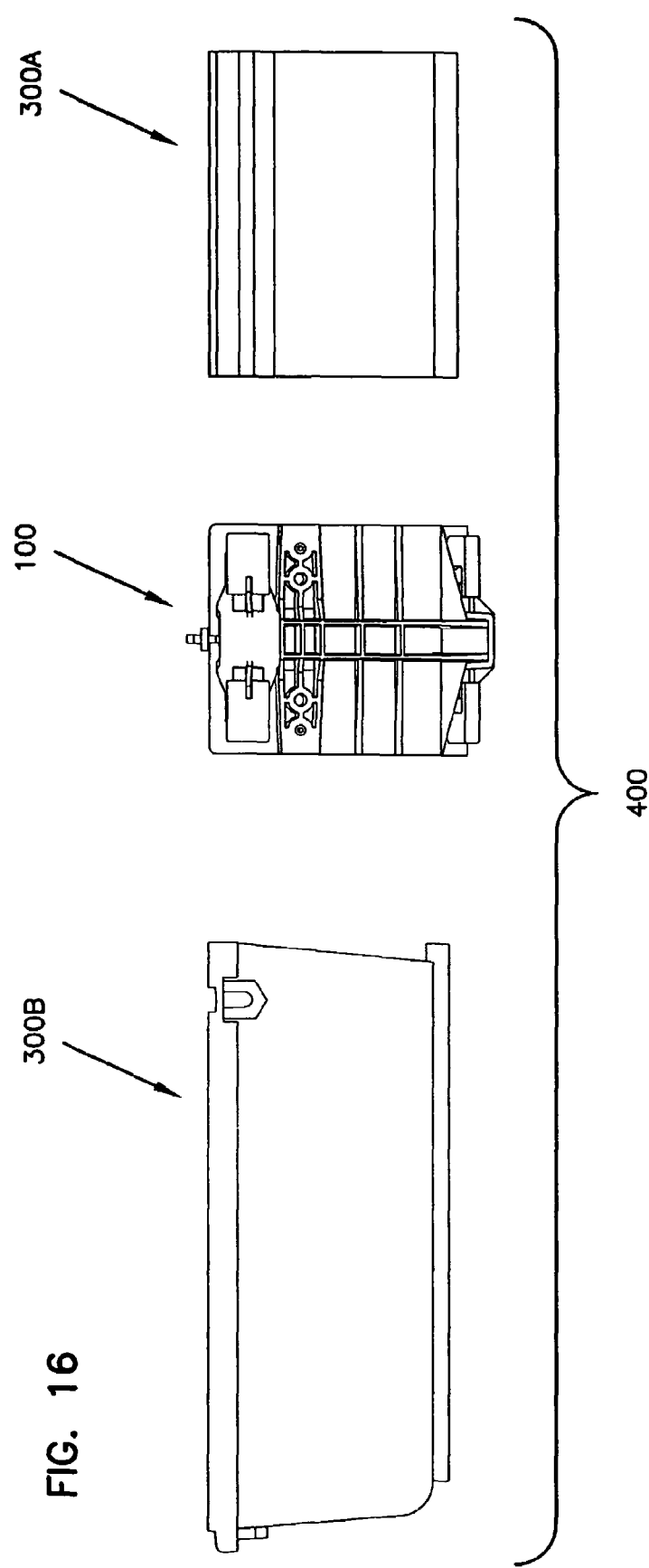

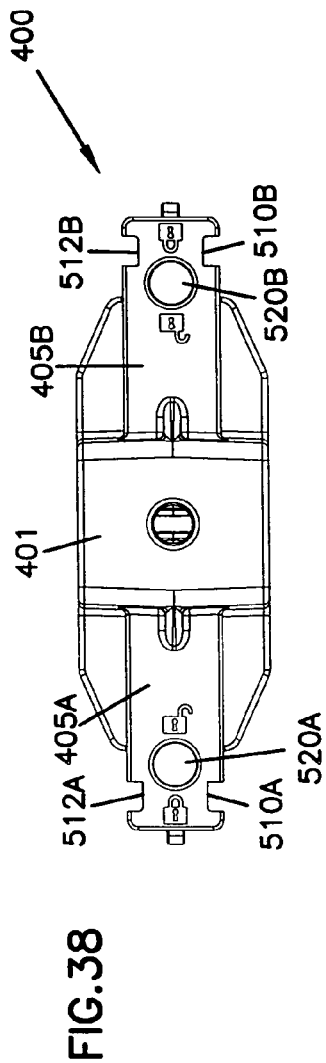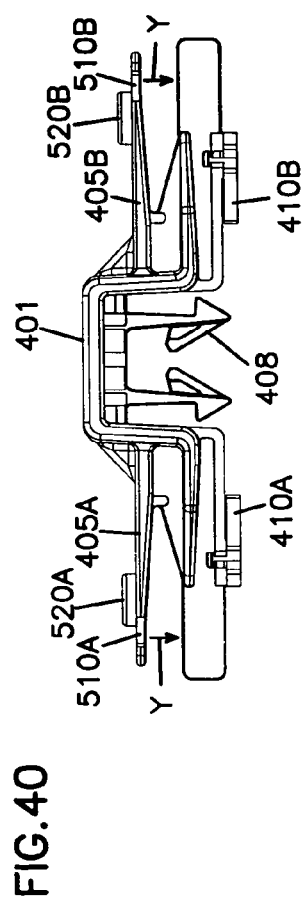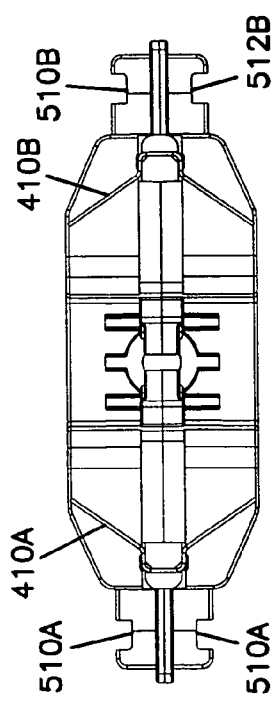

COUPLER FOR CABLE TROUGH

RELATED APPLICATION

The present application is a division of application Ser. No. 10/330,590, filed Dec. 27, 2002, now U.S. Pat. No. 6,715,719, which continuation-in-part of application Ser. No. 10/107,547, filed Mar. 27, 2002, the disclosure of which is incorporated herein.

TECHNICAL FIELD

The present invention relates to a system for the management and routing of telecommunication cables, and, more particularly, to a coupler for joining two or more trough members.

BACKGROUND

In the telecommunications industry, the use of optical fibers for signal transmissions is accelerating. With the increased utilization of optical fiber systems, optical fiber cable management requires industry attention.

One area of optical fiber management that is necessary is the routing of optical fibers from one piece of equipment to another. For example, in a telecommunications facility, optical fiber cables may be routed between fiber distribution equipment and optical line terminating equipment. In buildings and other structures that carry such equipment, the cable routing can take place in concealed ceiling areas or in any other manner to route cables from one location to another.

When routing optical fibers and other cables such as copper wires, it is desirable that a routing system will be readily modifiable and adaptable to changes in equipment needs. Accordingly, such routing systems include a plurality of components, such as trough members and couplers, for defining the cable routing paths. The trough members are joined together by couplings. U.S. Pat. Nos. 5,067,678, 5,316,243, and 5,752,781 teach cable routing systems that include a plurality of trough members and couplers.

Various concerns arise in the use of couplers for coupling trough members. One concern is that a plurality of hardware is used for joining the trough members. This hardware can be cumbersome. Further, there is sometimes a need to rearrange or change the trough members and couplers. It is desirable to provide couplers that can be disconnected.

SUMMARY

A coupler for a cable trough system according to one aspect of the invention may include a body including a bottom wall and two side walls defining a trough, the body having a body terminal end defining an overlap region, the overlap region being sized to slideably receive a terminal end of a trough member along a longitudinal direction of the body, and a spring coupled to the body and positioned in the overlap region for securing the terminal end of the trough member to the coupler, the spring including first and second spring arms extending generally in opposition to one another in a plane generally parallel to the longitudinal direction.

In another aspect, the invention relates to a cable trough system including a body including walls defining a bottom wall and two side walls defining a trough, the body having a body terminal end defining an overlap region, the overlap region being sized to slideably receive a terminal end of a trough member along a longitudinal direction of the body, and a spring coupled to the body and positioned in the overlap region for securing the terminal end of the trough member to the coupler, the spring including first and second spring arms aligned in a plane extending in a direction non-transverse with respect to the longitudinal direction.

In yet another aspect, the invention relates to a coupler for a cable trough system including a body including walls defining a bottom wall and two side walls defining a trough, the body having a body terminal end defining an overlap region, the overlap region being sized to slideably receive a terminal end of a trough member along a longitudinal direction of the body, and a spring coupled to one of the walls of the body for securing the terminal end of the trough member to the coupler, the spring including a first arm that is moveable in a plane generally parallel to the one wall between a locked position and an unlocked position.

In another aspect, the invention relates to a locking mechanism for coupling a coupler with a trough member including a main body including a first railway extending in a longitudinal direction, a first spring including first and second arms aligned in a plane generally parallel with respect to the longitudinal direction, the first spring being coupled to the main body, and a first spring release including first and second fingers, the first spring release slidingly engaging the first railway of the main body so that the first spring release slides in the longitudinal direction between a locked position, wherein the first and second fingers release the first and second arms of the first spring, and an unlocked position, wherein the first and second fingers compress the first and second arms of the first spring towards one another to release the locking mechanism and the coupler from the trough member.

In another aspect, the invention relates to a cable trough system comprising a trough member having a terminal end and including first and second sidewalls coupled to a bottom wall generally forming a trough, the trough member defining a slot, a coupler including a body including a bottom wall and two side walls defining a trough, the body having a body terminal end defining an overlap region, the overlap region being sized to slideably receive the terminal end of the trough member along a longitudinal direction of the body, and a spring coupled to the coupler, wherein the spring is received in the slot when the trough member is inserted into the coupler to couple the trough member to the coupler.

In yet another aspect, the invention relates to a coupler for a cable trough system including a trough member having a terminal end, the coupler including a body having an open end and including first and second guiding surfaces defining a spacing, the spacing being sized to receive the terminal end, with the first guiding surface slideably engageable with an internal wall surface of the terminal end and with the second guiding surface slideably engageable with the external wall surface of the terminal end, a spring coupled to the body and including first and second spring arms aligned in a plane generally parallel to the first and second guiding surfaces, and a spring release mechanism coupled to the body including a spring release, wherein, when the terminal end of the trough member is inserted into the coupler body, the first and second spring arms engage opposing portions of the trough member defining a slot, and wherein the spring release releases the first and second arms from engagement with the opposing portions when the spring release is slid in a direction parallel to the first and second guiding surfaces.

In another aspect, the invention relates to a method for using a coupler and a trough member, the method including steps of: providing a terminal end of the trough member coupled to the coupler, wherein the terminal end was inserted in a longitudinal direction into a spacing defined by the coupler; sliding a spring release in the longitudinal direction to disengage a spring from portions of the trough member defining a slot; and removing the terminal end of the first trough member from the spacing.

In yet another aspect, the invention relates to a method for using a coupler and a trough member including steps of: providing a terminal end of the trough member, the trough member defining a slot; providing a coupler defining a spacing and including a locking element with a spring; and inserting the terminal end of the trough member in a longitudinal direction into the spacing defined by the coupler so that the locking element is at least partially received in the slot, thereby coupling the terminal end of the trough member to the coupler.

In another aspect, the invention relates to a coupler for a cable trough system including a body including a bottom wall and two side walls defining a trough, the body having a body terminal end defining an overlap region, the overlap region being sized to slideably receive a terminal end of a trough member along a longitudinal direction of the body, and a locking element including a spring and a spring release mechanism, the spring including first and second spring arms extending generally in opposition to one another in a plane generally parallel to the longitudinal direction, and the locking element defining a hole configured to receive a fastener.

In yet another aspect, the invention relates to a coupler for a cable trough system including a body including walls defining a bottom wall and two side walls defining a trough, the body having a body terminal end defining an overlap region, the overlap region being sized to slideably receive a terminal end of a trough member along a longitudinal direction of the body, a spring including first and second spring arms extending at an angle with respect to one another, and a locking element coupled to the body and including a main body with a railway on which a spring release mechanism slides, the locking element including an unlocked position, in which the spring release mechanism is held by the locking element in engagement with the spring, and a locked position, in which the spring release slides along the railway in the longitudinal direction to release the spring.

In a further aspect, the invention relates to a locking element for coupling a coupler with a trough member, the locking element including a main body defining a hole configured to receive an attaching element and a first railway extending in a longitudinal direction away from the main body, the first railway defining first and second notches at an end of the railway, the first and second notches being positioned to generally oppose one another. The locking element also includes a first spring including first and second arms aligned in a plane generally parallel with respect to the longitudinal direction, the first spring being coupled to the main body, and a first spring release mechanism configured to slide along the first railway in a locked and an unlocked position, wherein the first spring release mechanism includes first and second ramps positioned such that, as the first spring release mechanism is slid from the locked position to the unlocked position, the first and second ramps push the first railway and then engage the first and second notches to hold the first spring release mechanism in the unlocked position.

BRIEF DESCRIPTION OF THE DRAWINGS

FIG. 16 is a side view of an embodiment of a trough system including a coupler and two trough members in exploded view in accordance with the present invention.

FIG. 37 is an inside view of the locking element shown in FIG. 35.

FIG. 38 is a top view of the locking element shown in FIG. 35.

FIG. 40 is a side view of the locking element shown in FIG. 35.

DETAILED DESCRIPTION OF THE PREFERRED EMBODIMENT

As used herein, the terms "couple" and "coupled" mean to join or attach one element in relation to a second element, whether the attachment is made directly with the second element or indirectly through intermediate components. As used herein, the term "slot" means a space defined by one or more surfaces and may include, without limitation, T-slots, closed slots, flanges, and projections.

Figure 1:
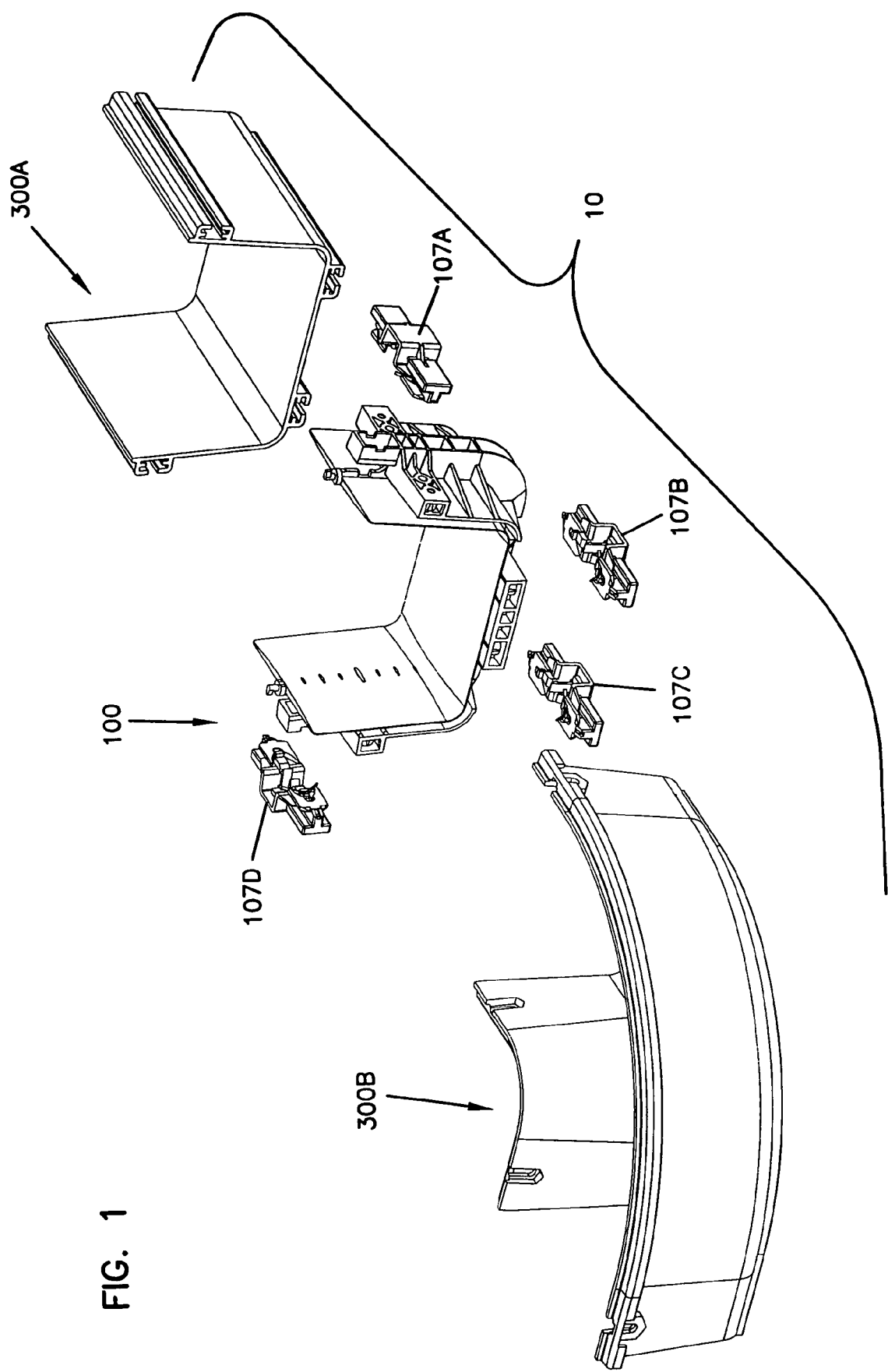
FIG. 1 is a perspective view of an embodiment of a trough system in accordance with the present invention shown in exploded form.

FIG. 1 shows an example of a trough system 10 that is an embodiment of the present invention. The system 10 includes a coupler 100 for interconnecting trough members 300A and 300B. The coupler 100 includes a locking mechanism having at least one locking element. In the embodiment shown, four locking elements 107A, 107B, 107C, and 107D are providing secure connection between the coupler 100 and a trough member, such as trough member 300A. The coupler 100 may also provide secure connections with one or more additional trough members, such as trough member 300B. In addition, the coupler may be configured to release the connections between the coupler 100 and the trough members 300A and 300B. In an example embodiment, the locking mechanism is tool-less (i.e., the locking mechanism does not require the use of a separate tool). However, locking mechanisms required to be engaged by an auxiliary tool are also within the scope of the present invention.

I. Coupler

As shown in FIGS. 2–6, the coupler 100 includes a first guiding surface 101 and a second guiding surface 102 at least partially surrounding the first guiding surface 101, as well as a first coupler end 110 and a second coupler end 111.

Figure 12:
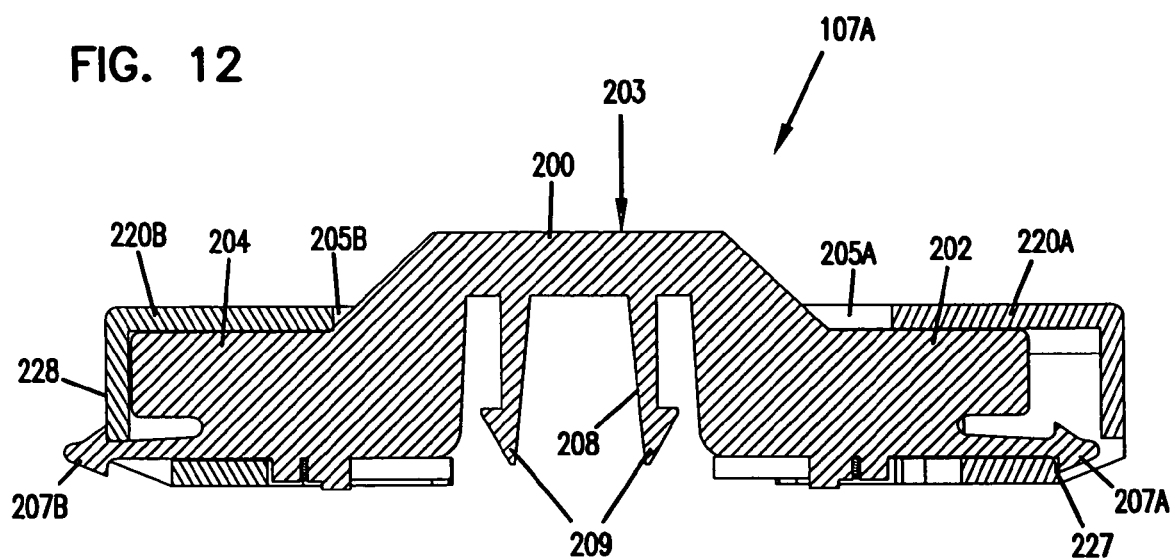
FIG. 12 is cross-sectional top view along line 12—12 of FIG. 9.

A spacing 103 is defined between the first guiding surface 101 and the second guiding surface 102. The spacing 103 is sized to receive a trough member (see, e.g., trough member 300 of FIGS. 12–14) or other trough system component inserted into the spacing 103 in a longitudinal direction 190.

Figure 3:
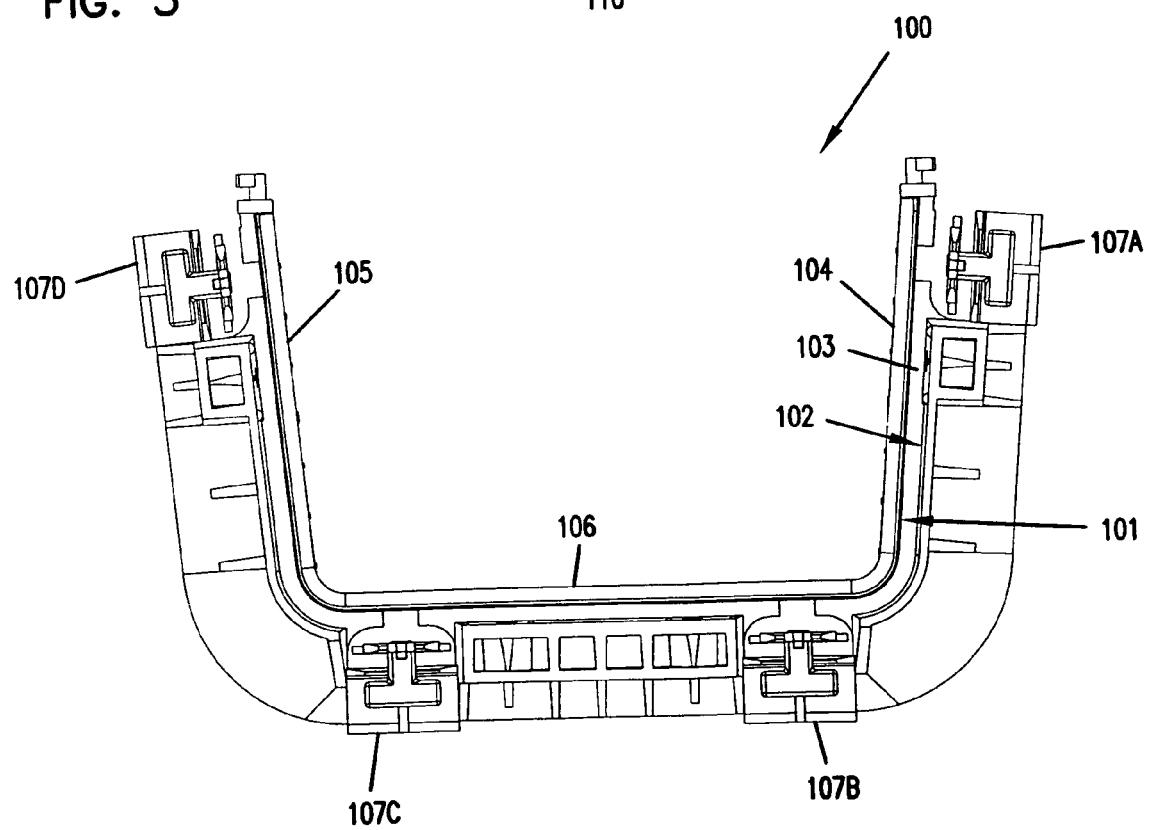
FIG. 3 is an end view of the coupler shown in FIG. 2.
Figure 4:
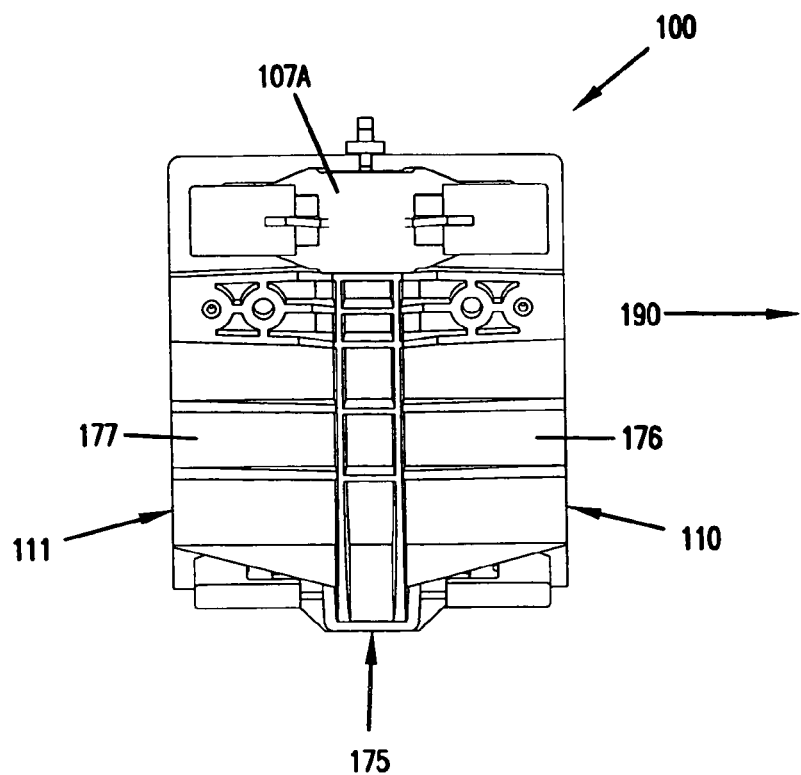
FIG. 4 is a side view of the coupler shown in FIG. 2.
Figure 5:
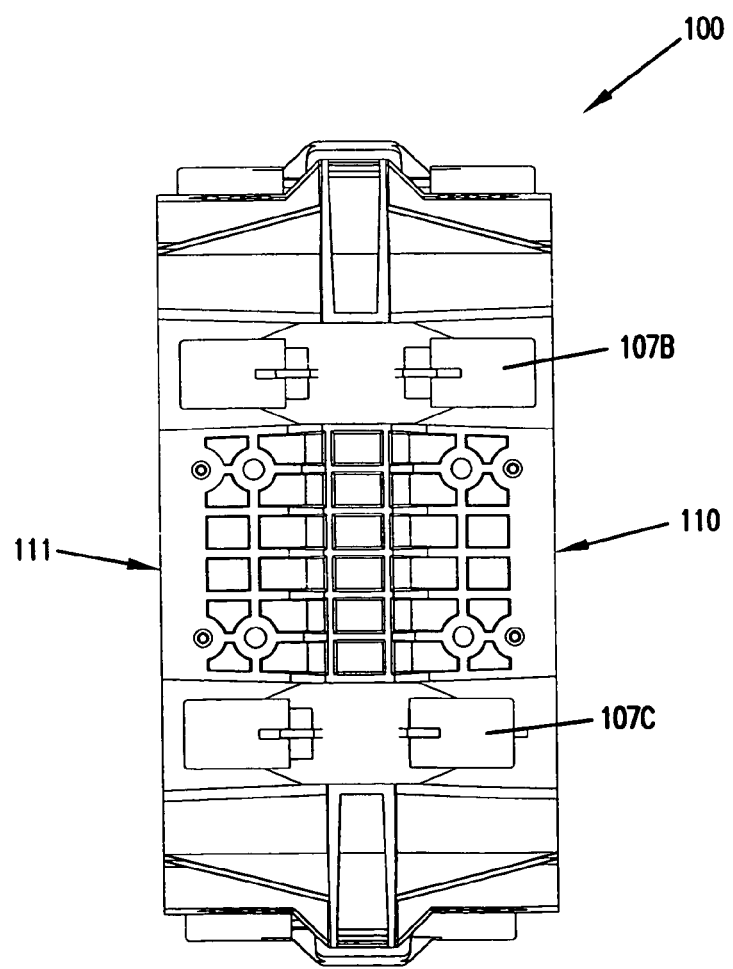
FIG. 5 is a bottom view of the coupler shown in FIG. 2.

As shown in FIG. 3, the first guiding surface 101 of the coupler 100 is generally in the shape of a trough, including a first side wall portion 104 and a second side wall portion 105, as well as a bottom wall portion 106 joining the first and second side wall portions 104 and 105. As used herein, the term "trough" means any structure that defines an interior in which an element such as an optical cable can be maintained. The second guiding surface 102 is also in the shape of a trough. A midpoint or midsection 175 divides the coupler 100 into first and second halves 176 and 177, and generally surrounds at least a portion of the first guiding surface 101.

As indicated above, the locking mechanism of the coupler is used to secure trough members to the ends 110 and 111 of the coupler 100. The locking elements 107A, 107B, 107C, and 107D of the locking mechanism are coupled to an exterior of the coupler 100, using, for example, a clip 208 as shown in FIGS. 7–10 and described below.

Although the first locking element 107A is described in detail below, the second, third, and fourth locking elements 107B, 107C, and 107D have an identical structure and function similarly in the illustrated embodiment.

The locking element 107A is shown in isolation in FIGS. 7–12. The locking element 107A includes a main body 200, springs 210A and 210B, and spring releases 220A and 220B. The main body 200 includes a first portion 202 and a second portion 204 coupled by a bridge 203. The main body further includes railways 205A and 205B, T-shaped detents 207A and 207B, and the clip 208.

Figure 8:
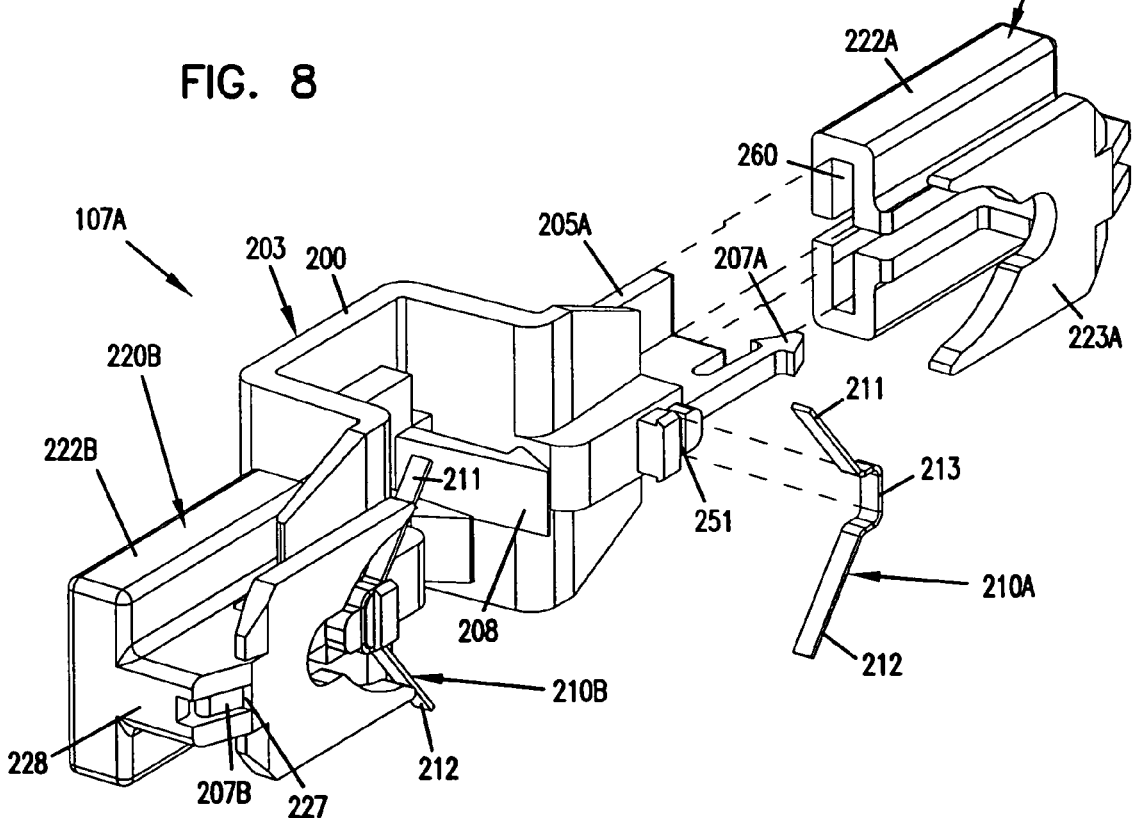
FIG. 8 is another perspective view of the locking element shown in FIG. 7 with one spring and spring release shown in exploded view.
Figure 9:
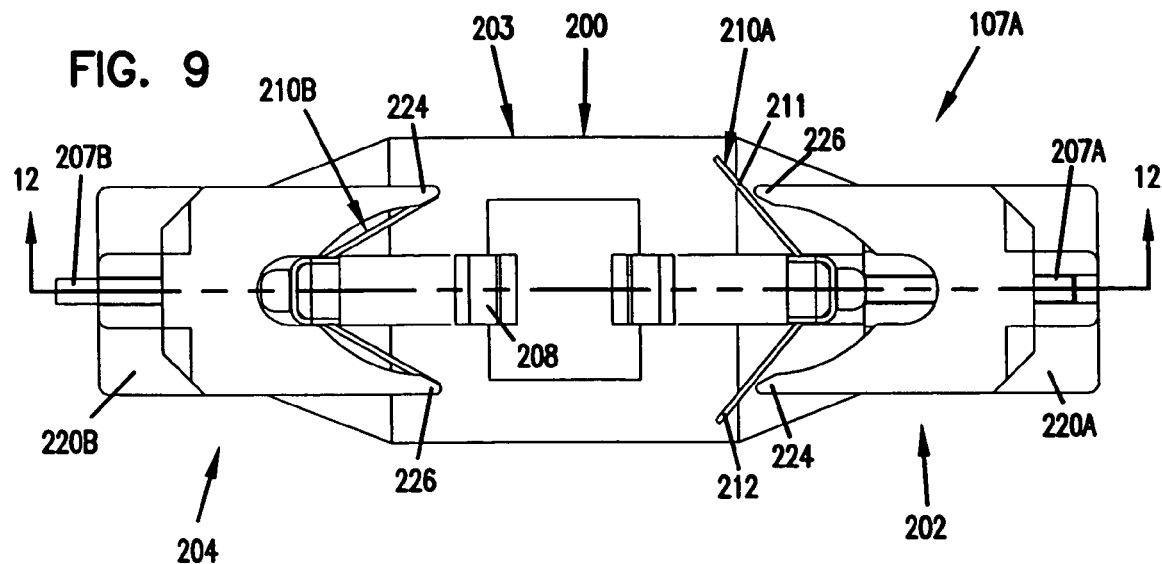
FIG. 9 is an inside view of the locking element shown in FIG. 7.
Figure 10:
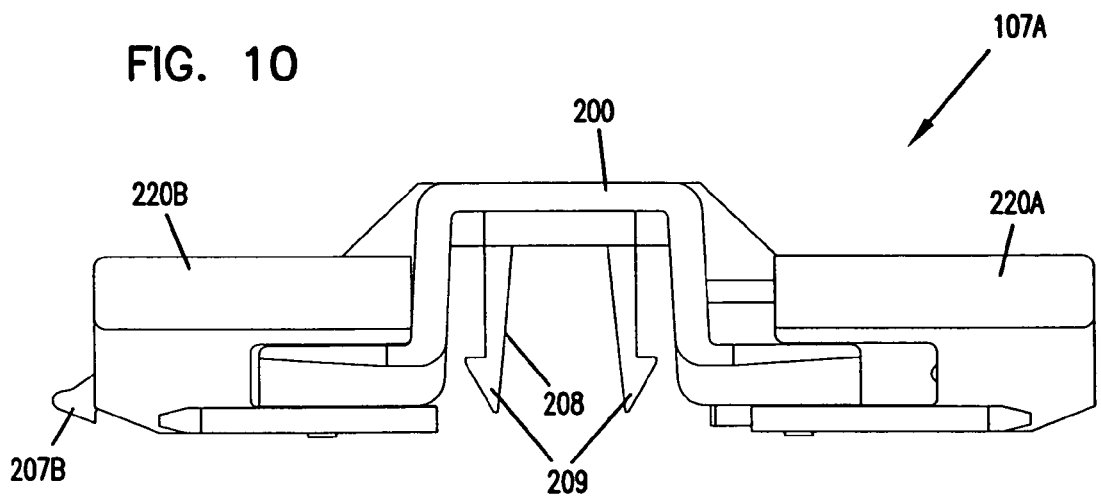
FIG. 10 is a top view of the locking element shown in FIG. 7.
Figure 11:
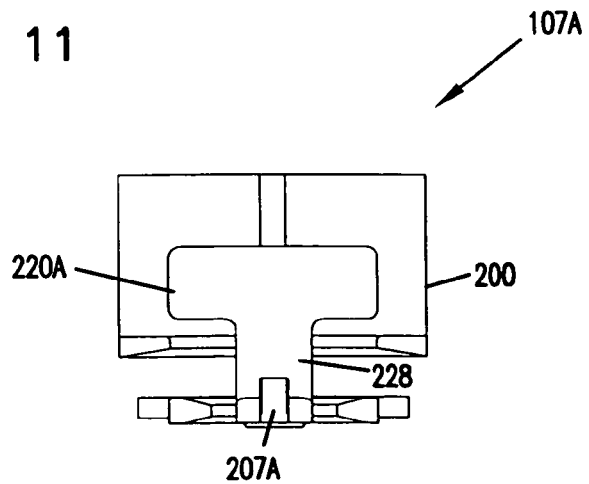
FIG. 11 is an end view of the locking element shown in FIG. 7.

The spring 210A, shown in exploded form in FIG. 8, includes first and second arms 211 and 212 coupled by a bridge 213. The first and second arms 211 and 212 are positioned to extend generally at an angle in opposition to one another. As used herein, to extend "generally in opposition" means to extend at diverging angles with respect to one another. In addition, the first and second arms are aligned generally in a plane. The spring 210A may be coupled to the coupler 100 by press-fitting the spring 210A into a slot 251 defined on the main body 200. The spring 210B is similarly configured. Preferably, springs 210A and 210B are one-piece, V-shaped leaf springs made of metal.

Although the example springs 210A and 210B are shown, other spring configurations may also be used. For example, a spring including a single arm, or arms extending at different angles to those shown, may also be used.

The spring release 220A includes a sliding portion 222A and a finger portion 223A with fingers 224 and 226. The sliding portion 222A defines an aperture 260 that is configured to slidingly engage and ride along the railway 205A between a locked position and an unlocked position. The spring release 220A is maintained on the railway 205A by the detent 207A that engages an edge 227 of the finger portion 223A as the spring release 220A is slid longitudinally in a direction away from the bridge 203 (i.e., the locked position).

The fingers 224 and 226 of the finger portion 223A are positioned to engage the spring arms 211 and 212 as the spring release 220A is slid longitudinally in a direction towards the bridge 203 from the locked position to the unlocked position. In the locked position, as shown, for example, in FIGS. 7 and 9, the fingers 224 and 226 of the spring release 220A release the spring arms 211 and 212 of the spring 210A. As the spring release 220A is slid towards the bridge 203 and the unlocked position, the fingers 224 and 226 push the spring arms 211 and 212 towards one another.

In a fully engaged or the unlocked position, as shown by the spring release 220B, the fingers 224 and 226 of the spring release 220B fully engage the spring arms 211 and 212 of the spring 2101B. It is therefore possible for one spring release of the locking element 107A to be in the locked position, while the other spring release is in the unlocked position. For example, in FIG. 7, the spring release 220A is in the unlocked position, while the spring release 220B is in the locked position.

With no external force being applied, the spring release 220A is forced by the spring 210A into the locked position. However, the spring release, as is shown by the spring release 220B in FIGS. 7 and 12, may be maintained in the unlocked position by the detent 207B that engages an edge 228 of the sliding portion 222B of the spring release 220B when the spring release is placed in the fully unlocked position. The spring release 220A is similarly configured.

Other configurations for the spring release, and specifically, the fingers, are also possible. For example, the fingers may be positioned to engage a portion of the spring arms closer to the bridge of the spring, thereby allowing for greater movement of the spring arms by the fingers. In addition, the spring release may optionally be removed from the locking element.

Figure 2:
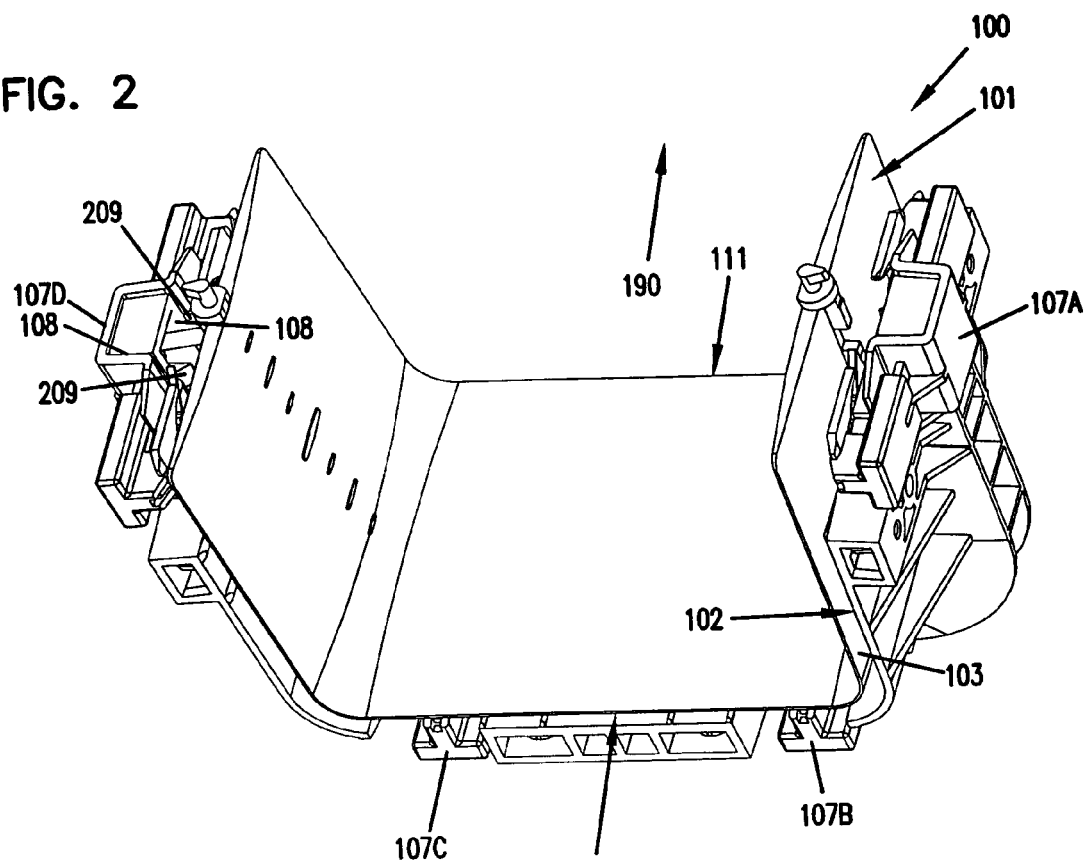
FIG. 2 is a perspective view of an embodiment of a coupler in accordance with the present invention.
Figure 6:
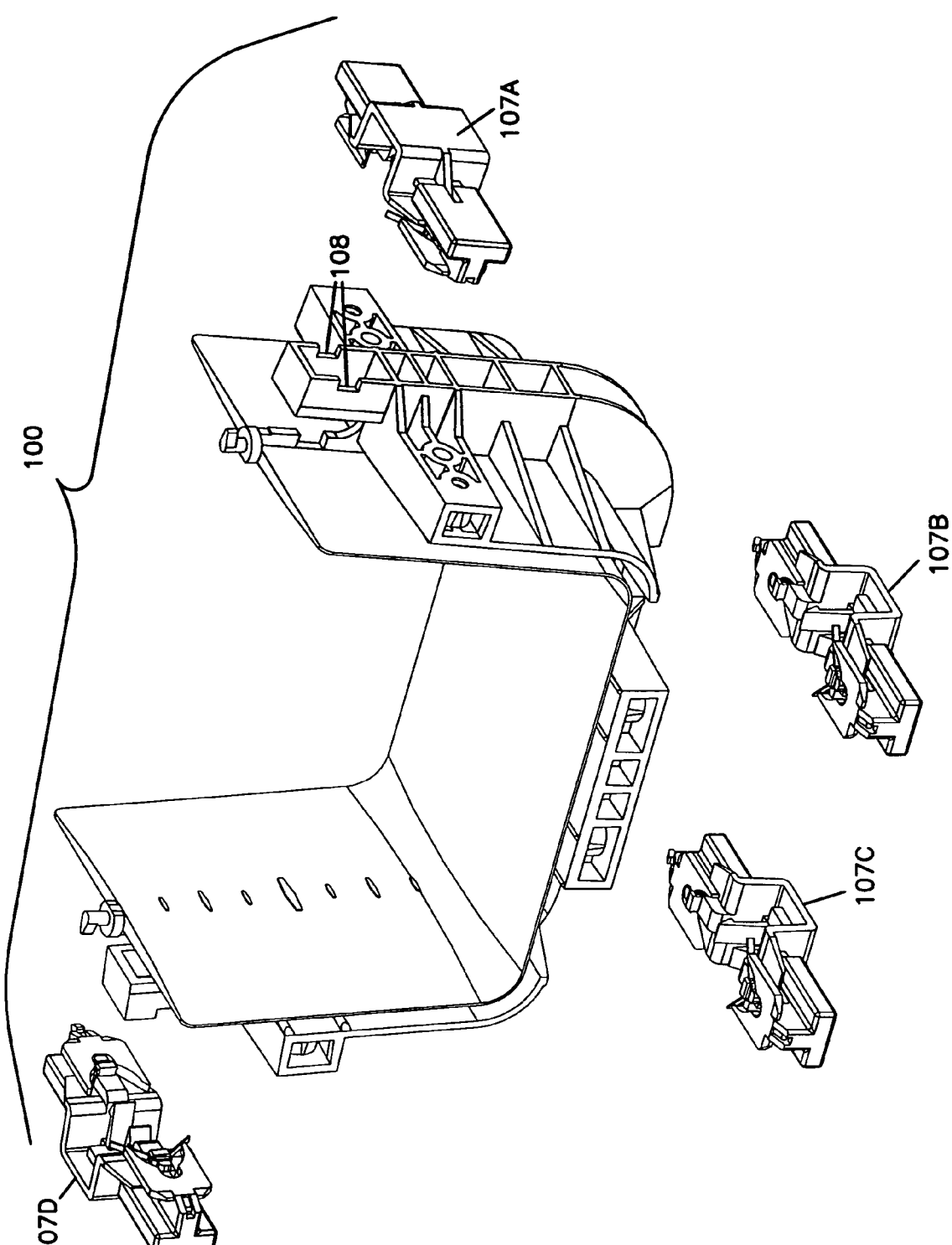
FIG. 6 is a perspective view of the coupler of FIG. 2 with one of the locking elements shown in exploded view.
Figure 7:
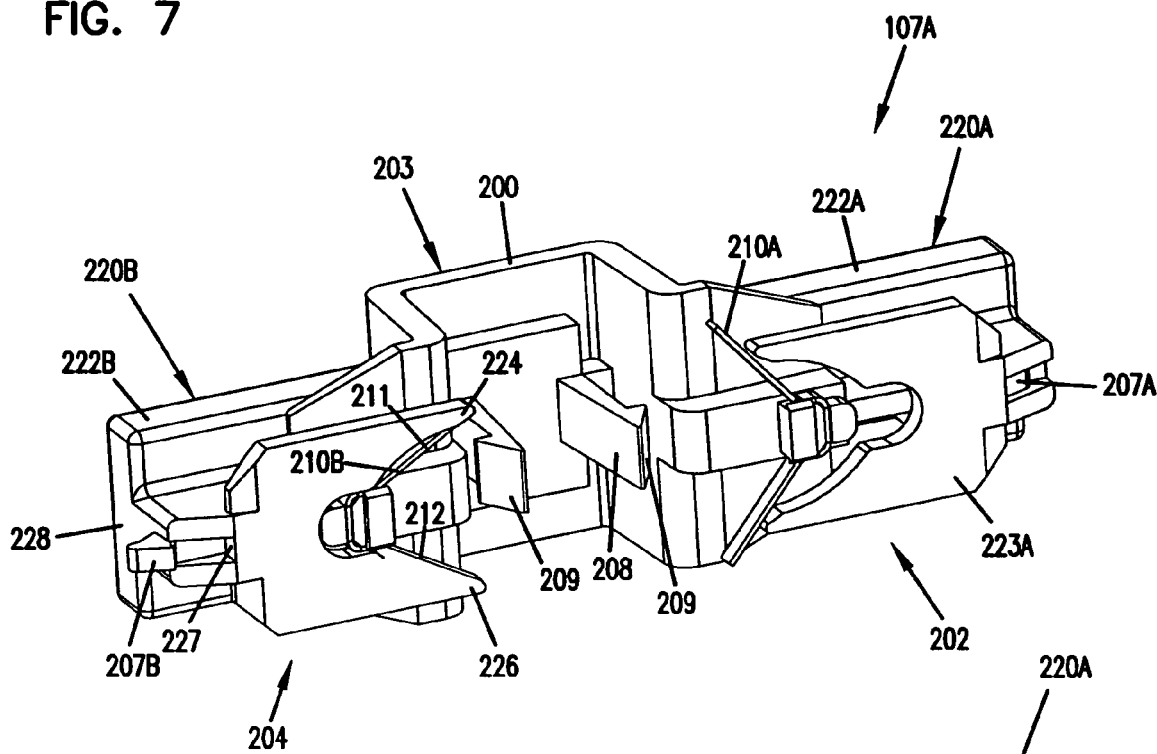
FIG. 7 is a perspective view of an embodiment of a locking element in accordance with the present invention.

As noted above, the locking element 107A is coupled to the coupler 100 using the clip 208 extending from the bridge 203 of the locking element 107A, as is shown in FIGS. 7–10 and 12. As shown in FIGS. 2 and 6, the clip 208 is sized to extend through an interior portion defined by walls 108 on the coupler 100, and detents 209 on the end of the clip 208 engage an edge of the walls 108 facing the coupler, thereby coupling the locking element 107A to the coupler 100. This configuration for attaching the locking element to the coupler may be advantageous, for example, because the locking element can be snap-fit onto the coupler at the desired time. In addition, it is possible to replace a locking element, if needed.

II. Trough

Figure 15:
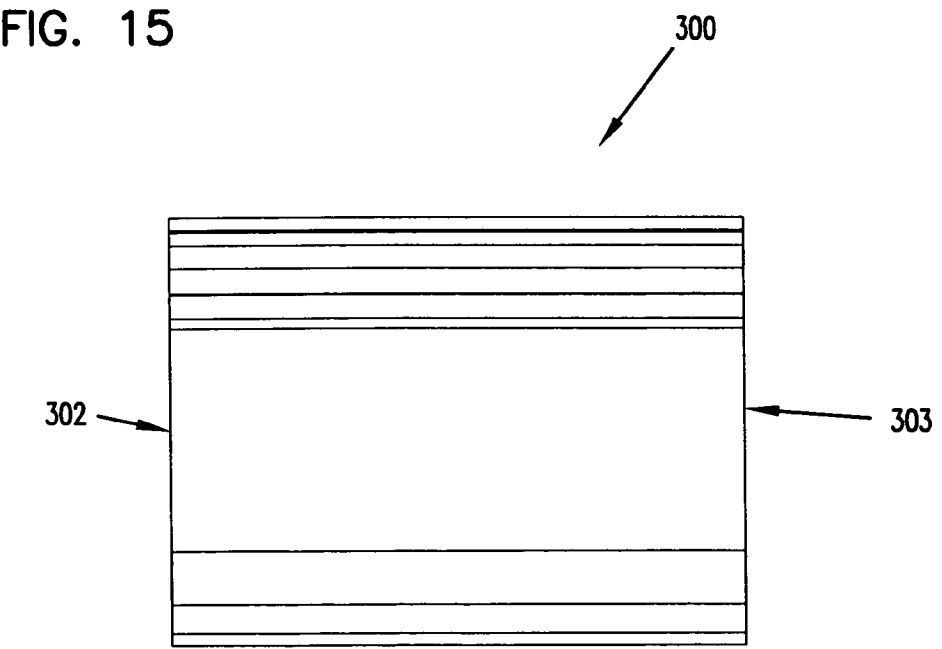
FIG. 15 is a side view of the trough member shown in FIG. 13.
Figure 13:
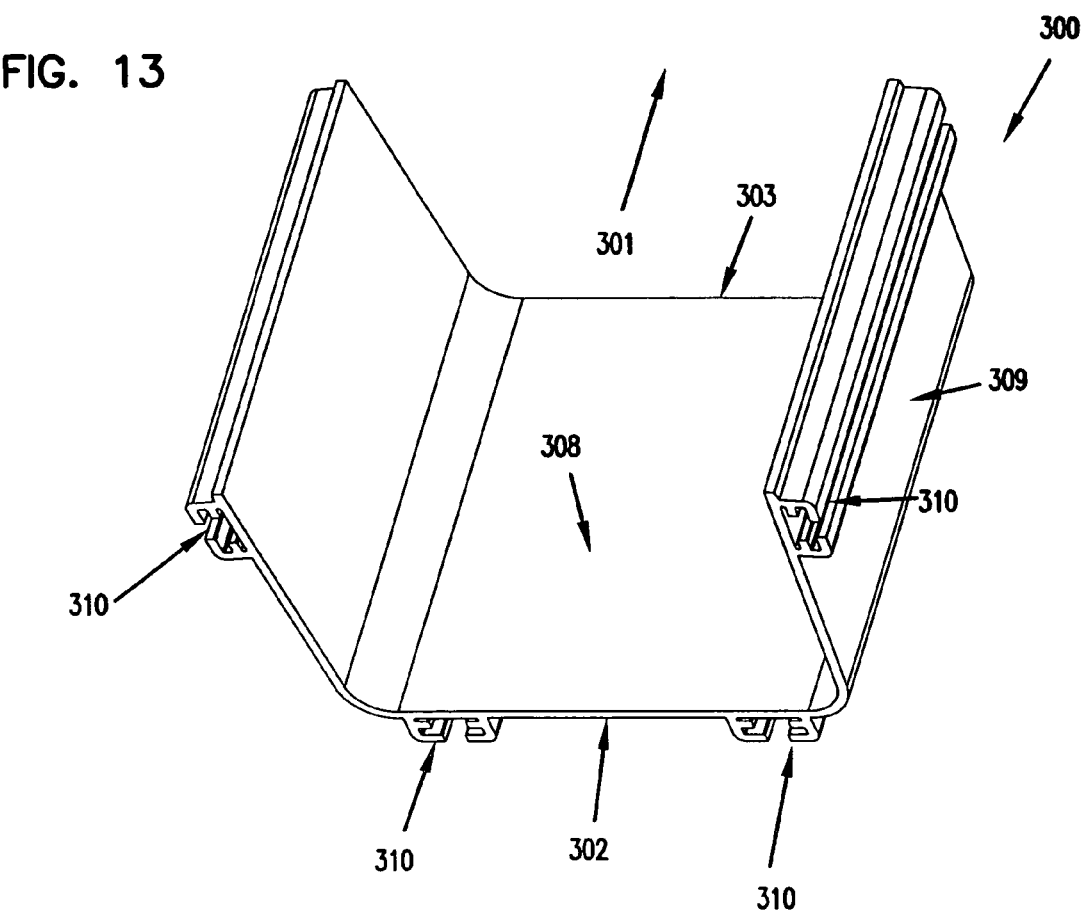
FIG. 13 is a perspective view of an embodiment of a trough member in accordance with the present invention.
Figure 14:
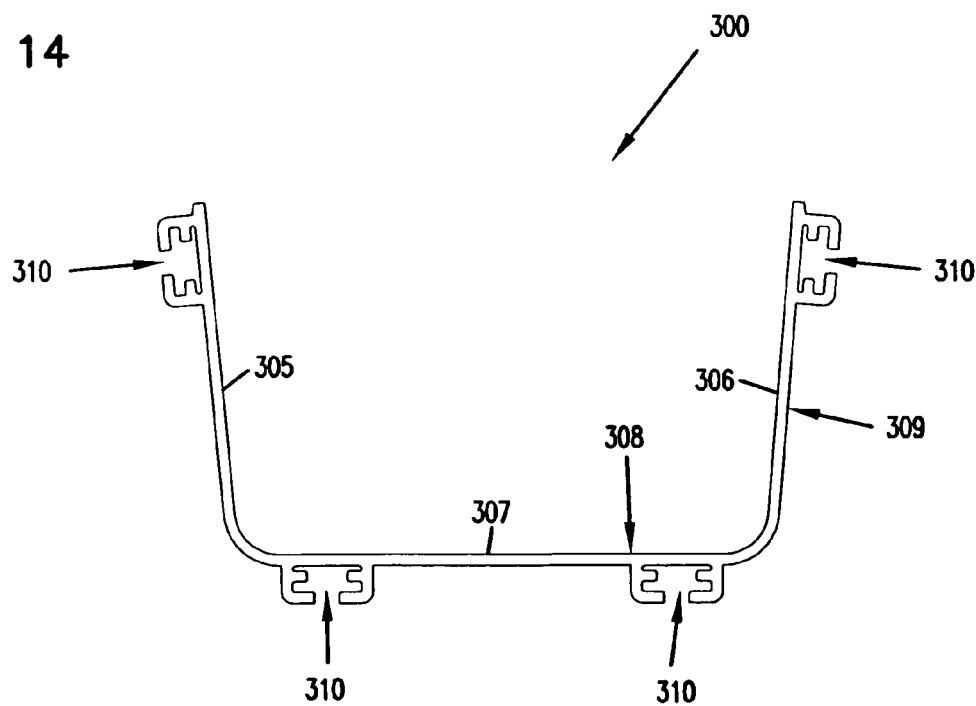
FIG. 14 is an end view of the trough member shown in FIG. 13.
Figure 17:
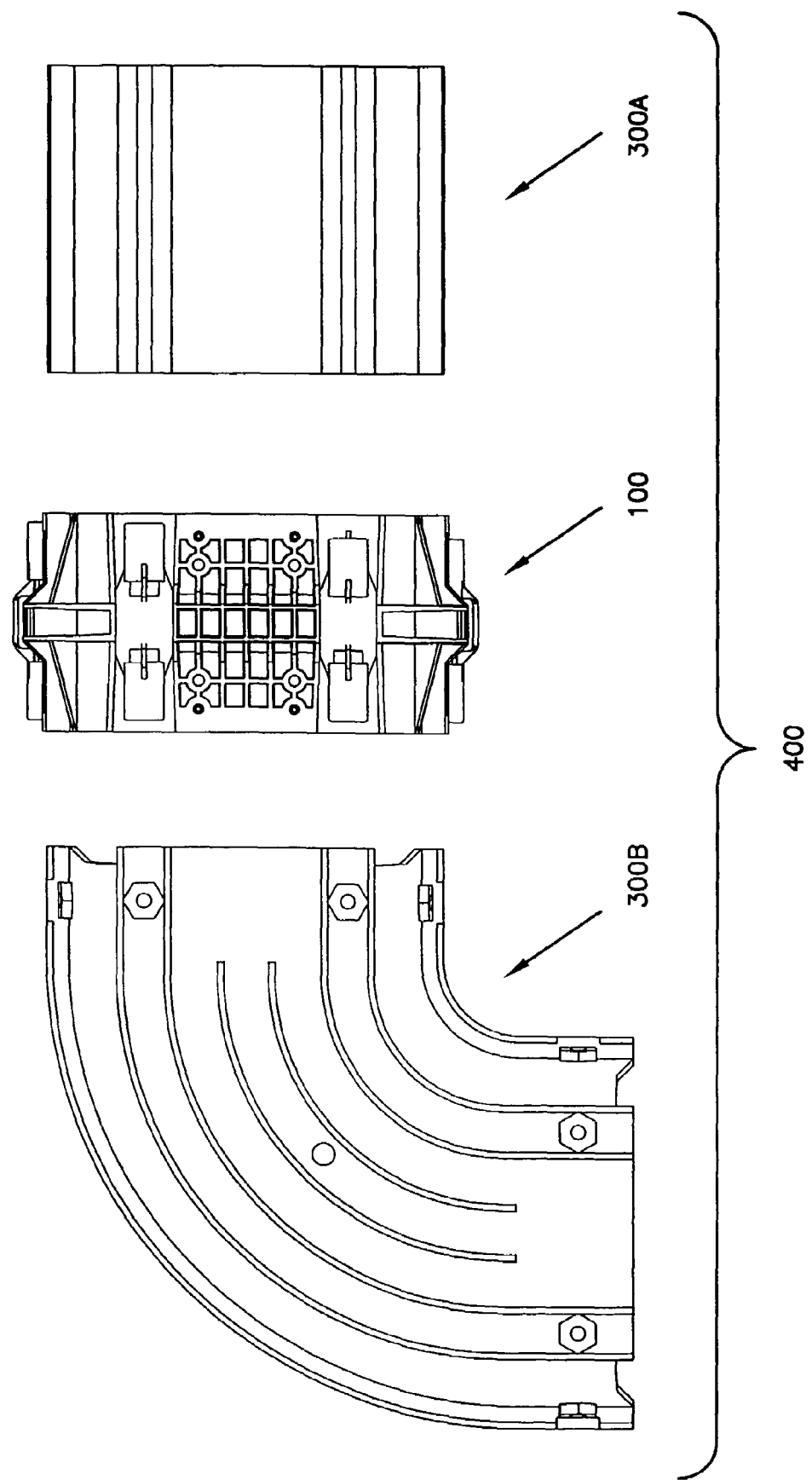
FIG. 17 is a bottom view of the trough system shown in FIG. 16.
Figure 18:
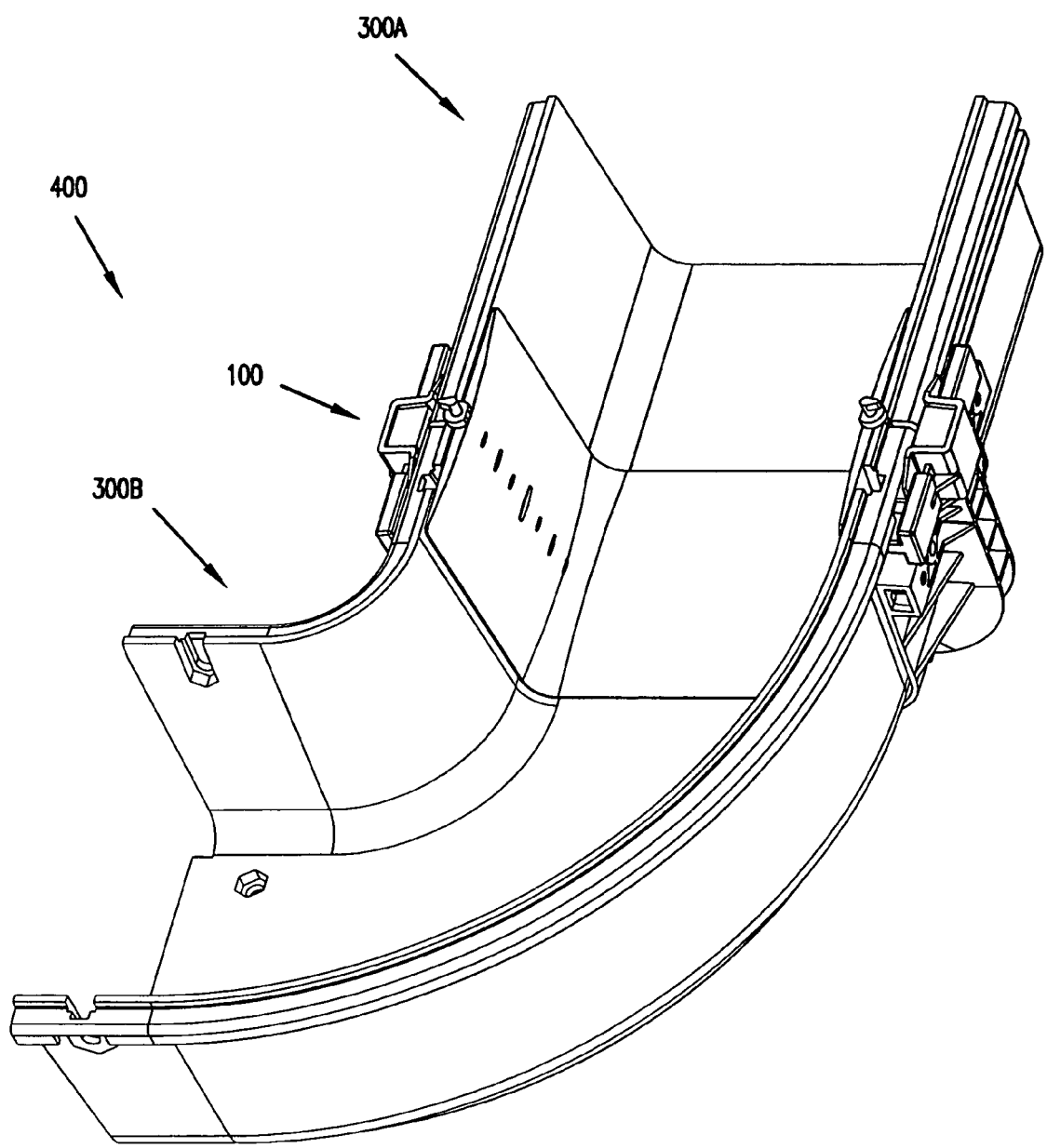
FIG. 18 is a perspective view of the trough system shown in FIG. 16 in assembled form.

Referring now to FIGS. 13–15, an example embodiment of a trough member 300 is shown according to the present invention. As used herein, the term trough member is used to refer to any trough, fitting, railway, raceway, or similarly configured component including any number of ends. Although a specific embodiment of a trough member is shown in and described with respect to FIGS. 13–15, any other trough member may also be used.

The trough member 300 includes a first terminal end 302 and a second terminal end 303. The trough member 300 is generally in the shape of a trough including first and second side walls 305 and 306 coupled by a bottom wall 307, thereby defining an interior surface 308 and an exterior surface 309. Walls 305, 306 and 307 are each generally planar. The exterior surface 309 define one or more slots 310 on the side walls 305 and 306 and bottom wall 307. The slots 310 extend in a longitudinal direction 301 of the trough member 300 from the first terminal end 302 to the second terminal end 303. Typically, slots will be provided for at least one, and preferably each, locking element, as described further below.

Alternative configurations and placement for the slots 310 are also possible. For example, the slots 310 may be T-slots, as shown on the example embodiment of the trough 300. As used herein, the term "T-slot" means a slot having a narrow access opening and a wider interior region. In addition, the slots 310 may also be flanges or opposing projections. For example, the trough member 300B, known to those skilled in the art as a fitting and shown in FIGS. 16–23, includes slots defined by flanges 370 on side walls (see FIG. 19) and slots defined by opposing projections 371 and 372 on the bottom wall (see FIG. 22), rather than T-slots. Other configurations are possible. Preferred slot configurations include at least two opposing surfaces that extend in the longitudinal direction 301, although a single surface may also be used. The slots 310 may not extend fully between the terminal ends of the trough member. The placement of the slots on the exterior surface of the trough members may be altered. More or fewer slots may also be provided.

III. System

Referring now to FIGS. 16–23, an embodiment of a trough system 400 is shown including the coupler 100 as well as first and second trough members 300A and 300B. As illustrated, the terminal ends of the trough members 300A and 300B may be slidingly engaged in the spacing 103 between the first and second guiding surfaces 101 and 102 of the coupler 100. In other words, the thickness of the walls of each of the trough members 300A and 300B, or the distance between the inner and outer surfaces, are sized to fit within the spacing 103 of the coupler 100. The coupler 100 overlaps the terminal ends of each of the trough members 300A and 300B to form the coupling, the overlap defining an overlap region.

Figure 19:
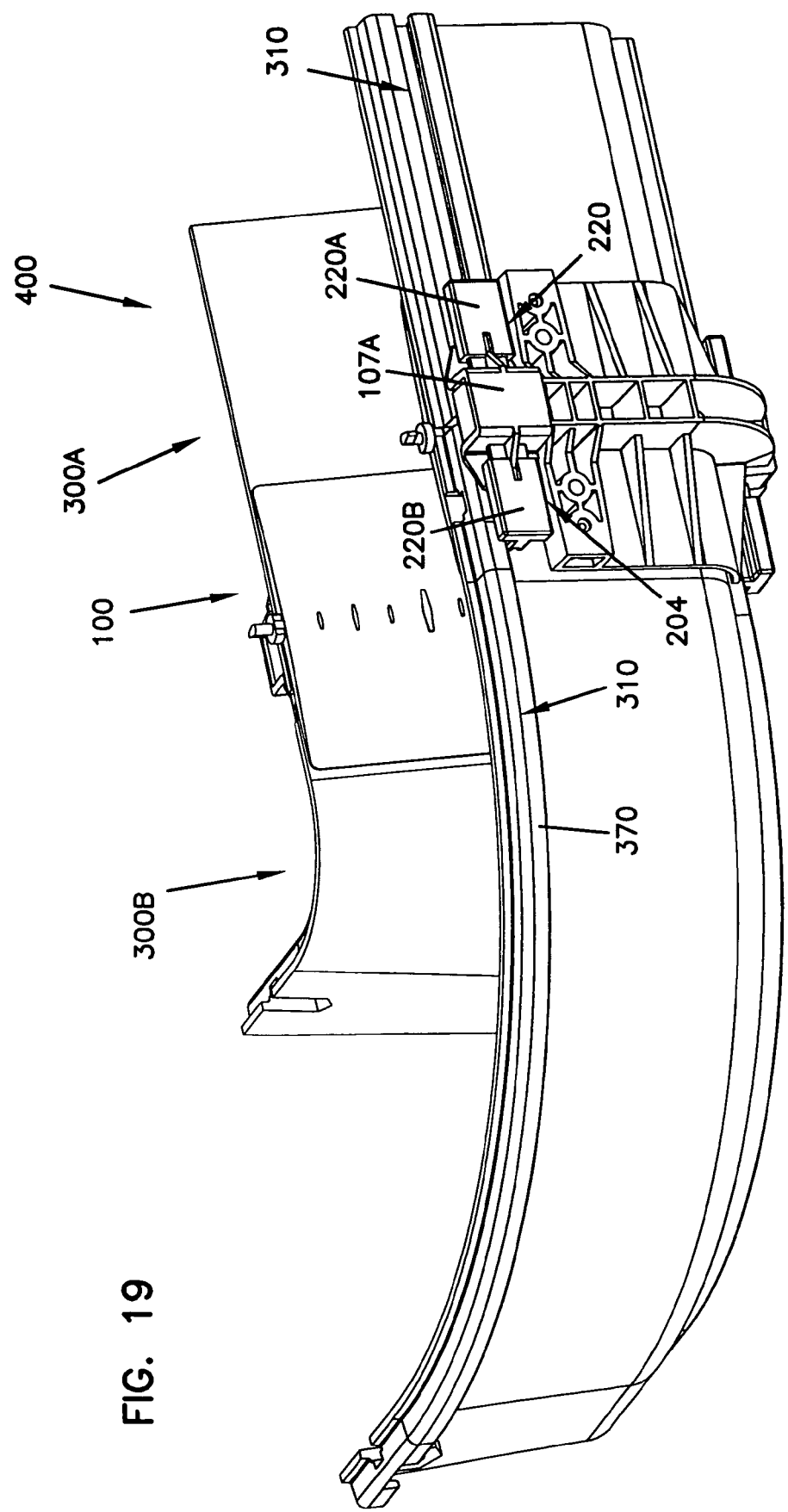
FIG. 19 is an enlarged perspective view of a portion of the trough system shown in FIG. 18 from a different angle.
Figure 20:
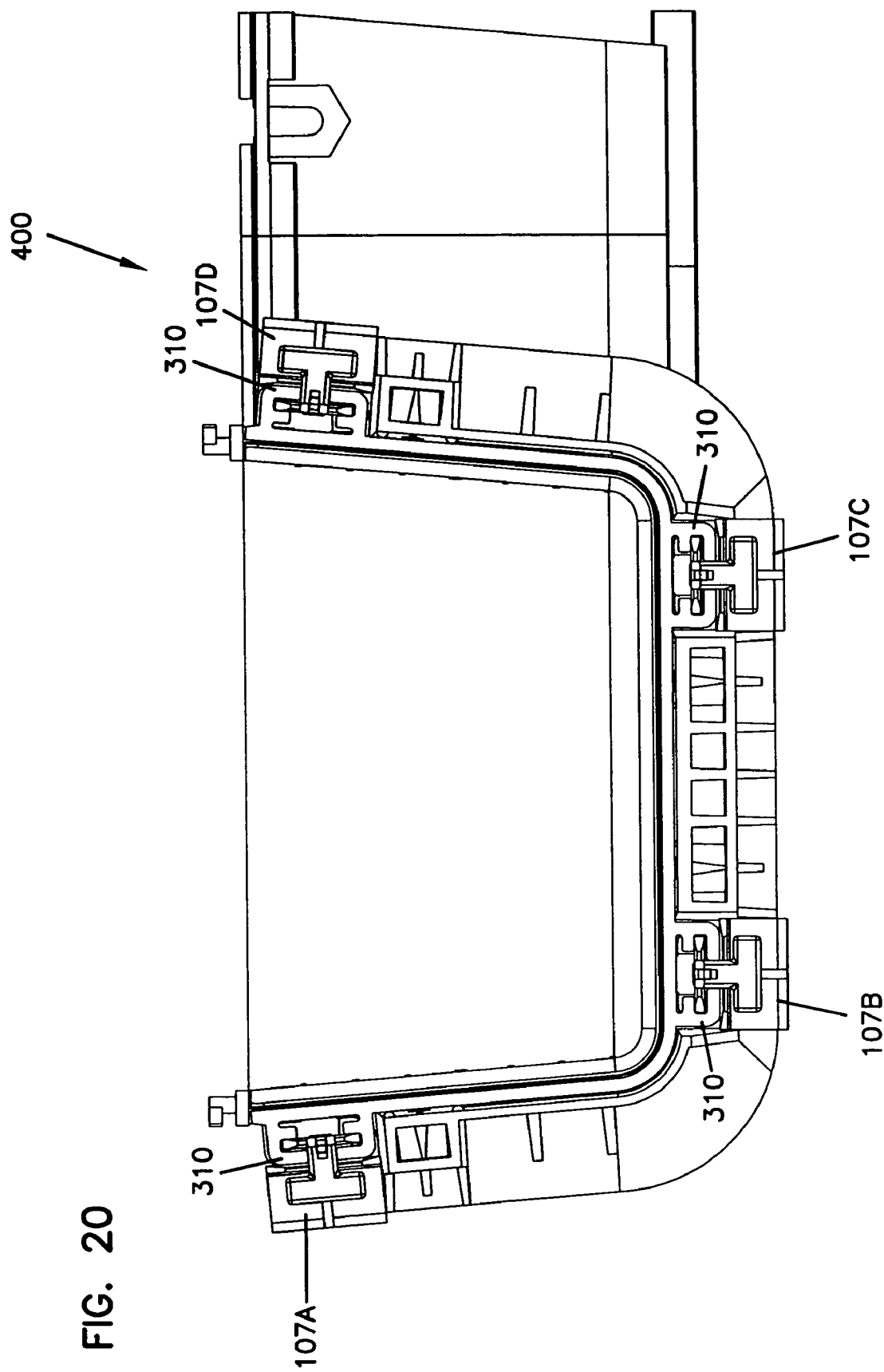
FIG. 20 is an end view of the trough system shown in FIG. 18.

As each trough member is inserted into a respective end of the coupler 100, a portion of each locking element is slidingly received within each corresponding slot. For example, as shown in FIG. 19, at least part of the first portion 202 of the locking element 107A is partially received within the slot 310 of the trough member 300A. Similarly, at least part of the second portion 204 of the locking element 107A is received in a corresponding slot 310 of trough member 300B.

Figure 21:
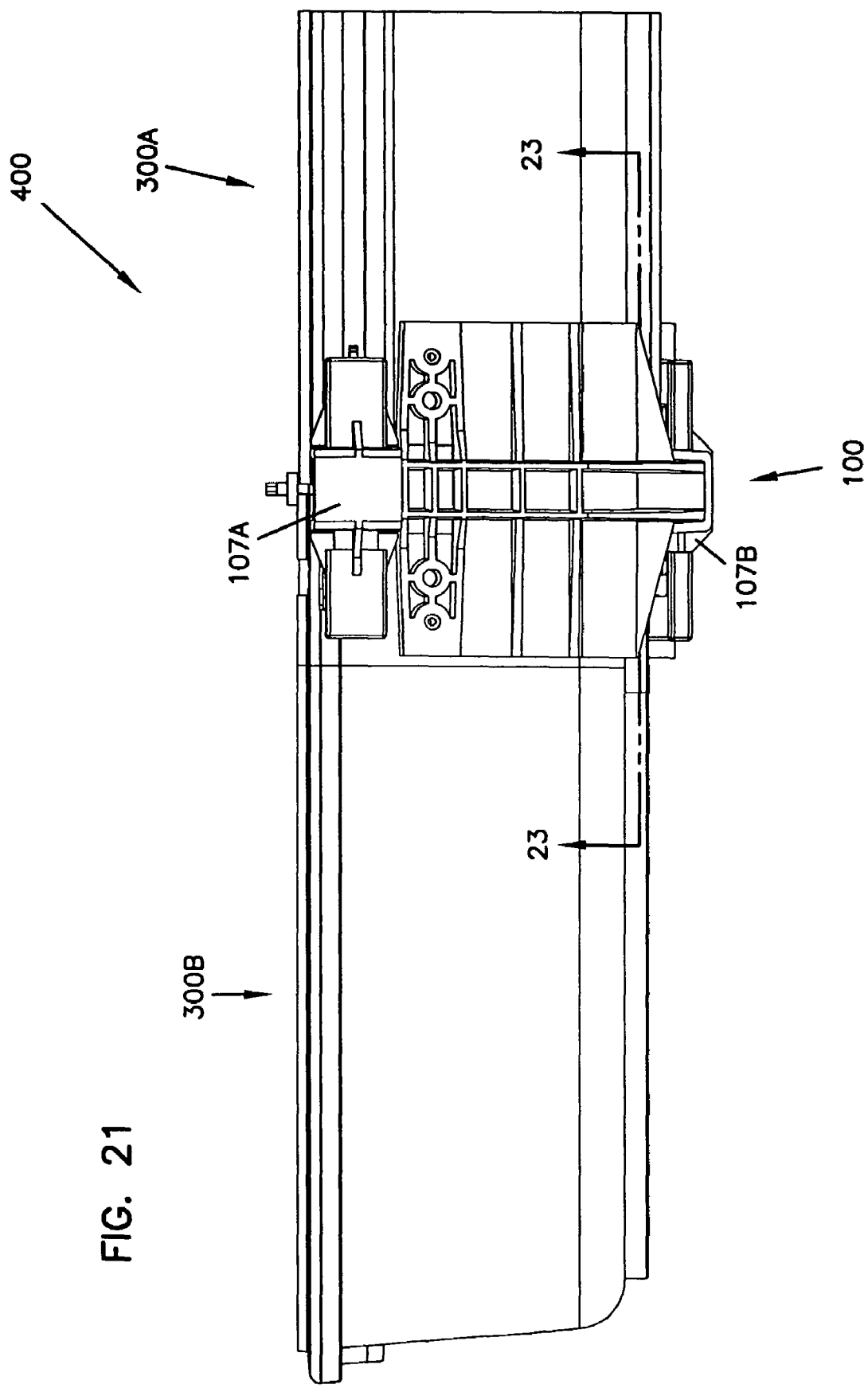
FIG. 21 is a side view of the trough system shown in FIG. 18.
Figure 22:
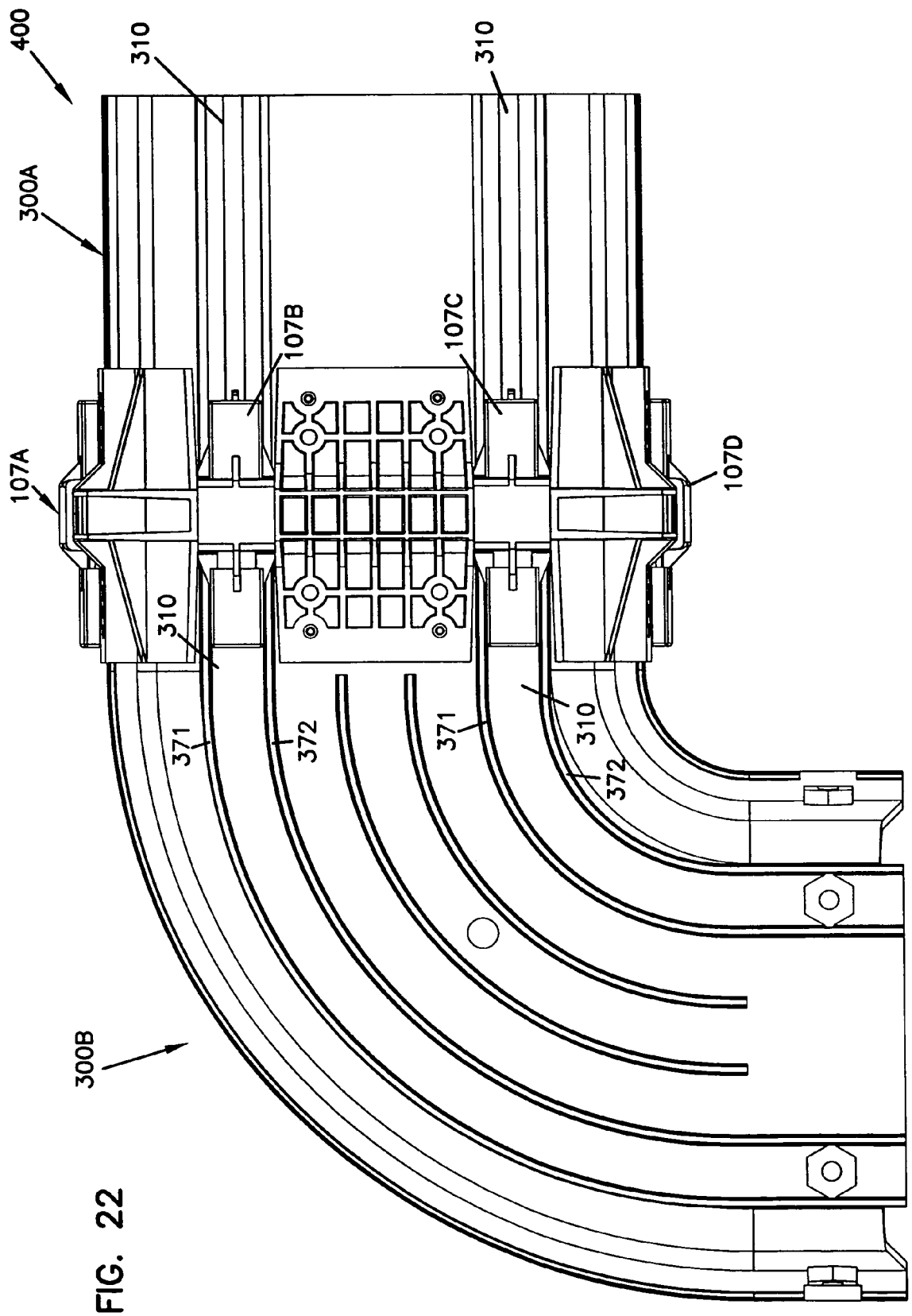
FIG. 22 is a bottom view of the trough system shown in FIG. 18.
Figure 23:
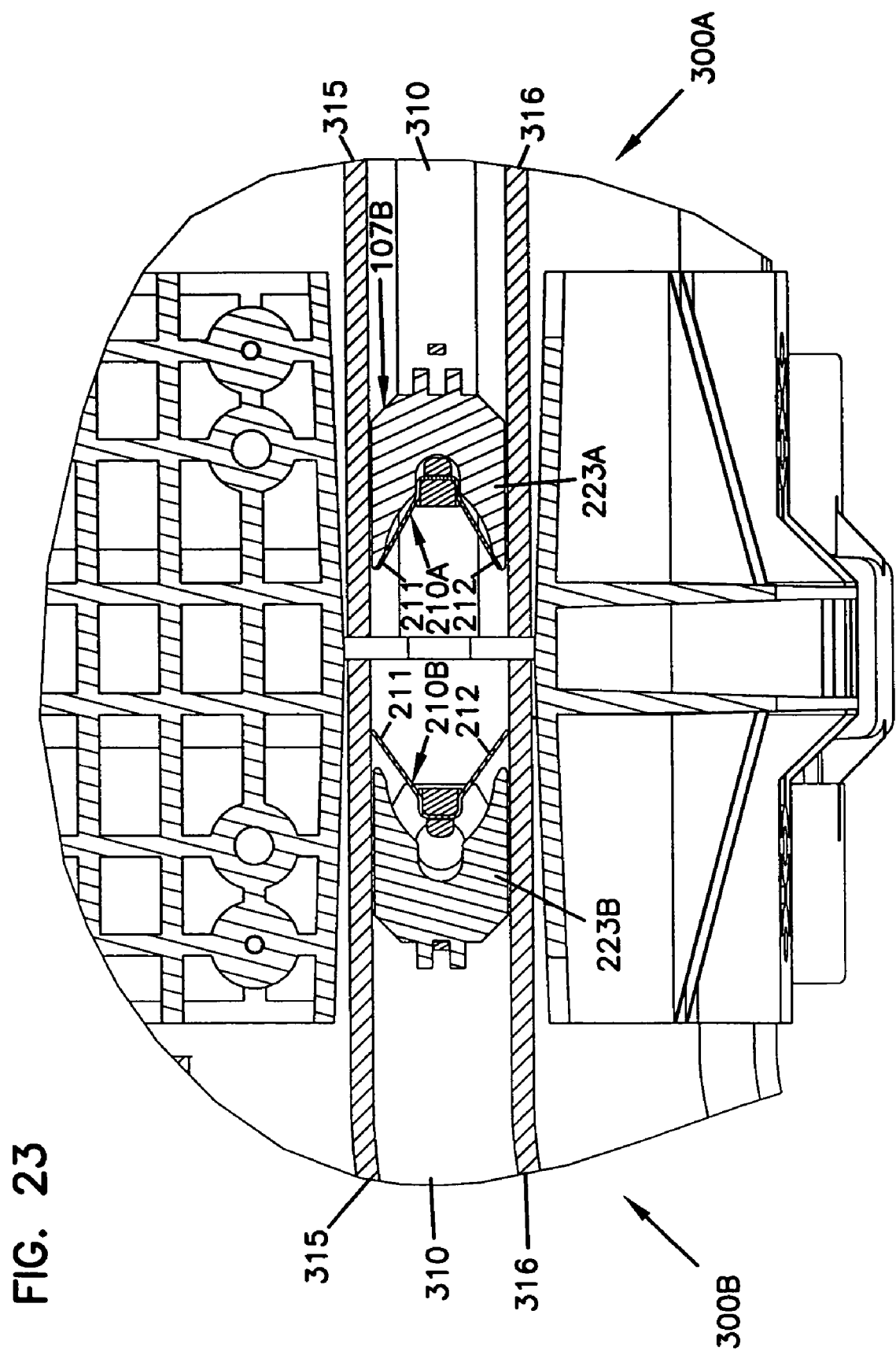
FIG. 23 is an enlarged cross-sectional view taken along line 23—23 of FIG. 21 showing a portion of the trough system including a locking element.
Figure 25:
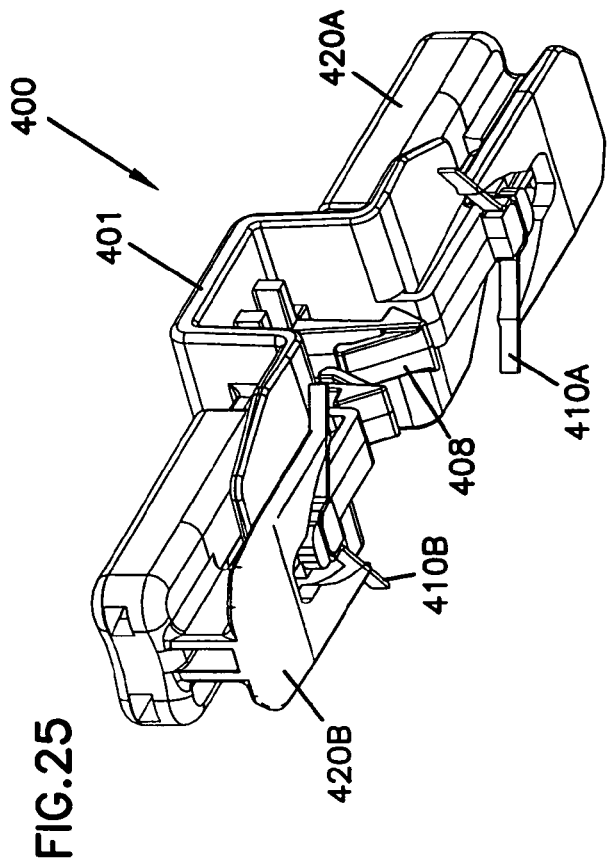
FIG. 25 is another perspective view of the locking element shown in FIG. 24.
Figure 28:
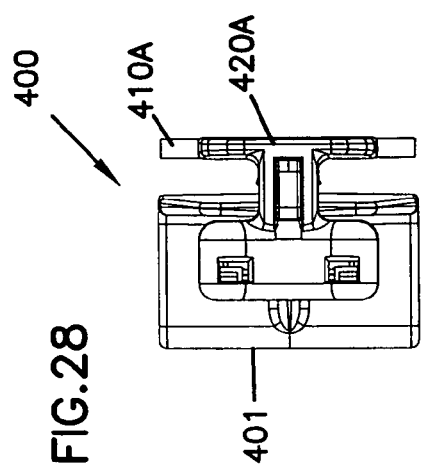
FIG. 28 is an end view of the locking element shown in FIG. 24.
Figure 24:
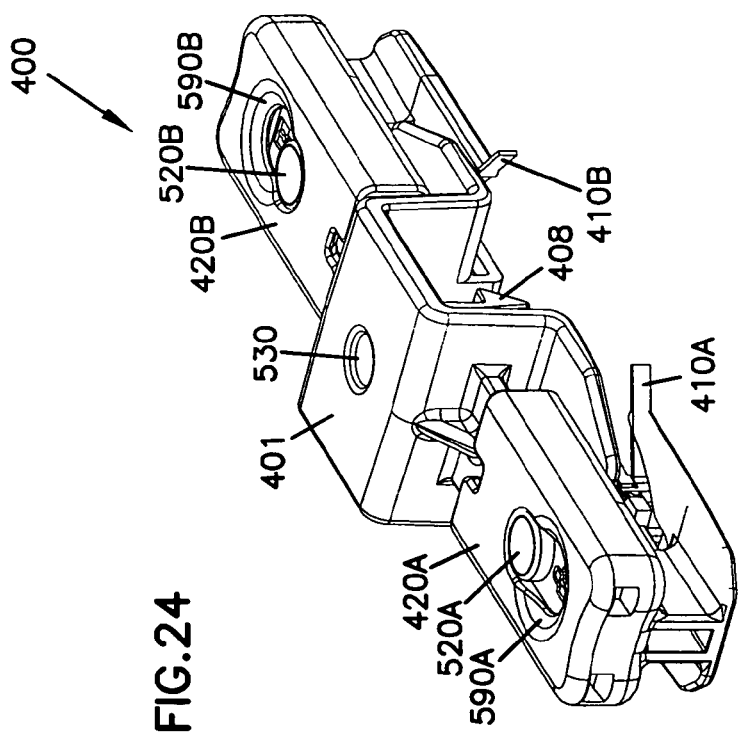
FIG. 24 is a perspective view of another embodiment of a locking element in accordance with the present invention.
Figure 29:
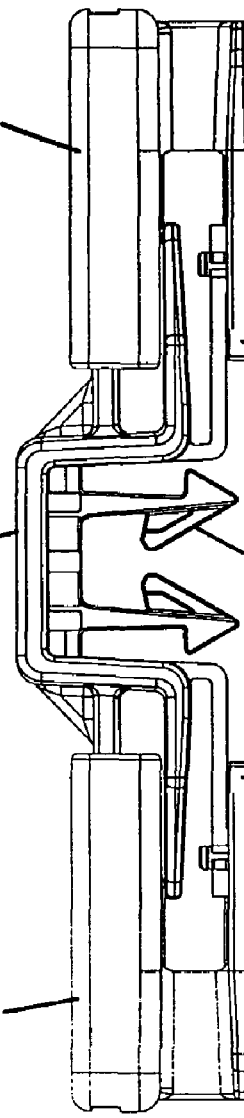
FIG. 29 is a side view of the locking element shown in FIG. 24.
Figure 26:
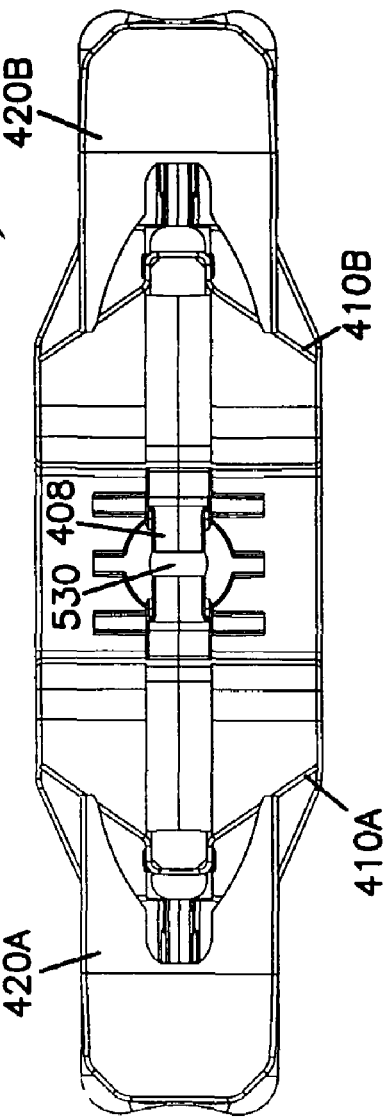
FIG. 26 is an inside view of the locking element shown in FIG. 24.

As shown in the cross-sectional view of FIG. 23 taken along line 23—23 of FIG. 21, the springs 210A and 210B and finger portions 223A and 223B of locking element 107B are positioned within the slot 310 of the trough members 300A and 300B. With a finger portion, such as finger portion 223B, in the locked position, the spring arms 211 and 212 of the spring 210B resiliently engage opposing portions 315 and 316 of the slot 310, thereby maintaining the locking element 107B within the slot 310 and coupling the coupler 100 to the trough member 300B.

The opposing portions 315 and 316 each extend generally parallel to the longitudinal direction 190 of the coupler 100. Likewise, the forces applied by the spring arms 211 and 212 are generally exerted in opposite directions aligned in a plane extending generally parallel to the longitudinal direction 190 of the coupler 100 along one of the walls of the trough.

In contrast, with a finger portion, such as finger portion 223A, in the unlocked position, the fingers 224 and 226 fully engage spring arms 211 and 212 of the spring 210A, pushing the arms towards each other and away from the portions 315 and 316 so that the trough member 300A can be slid in the longitudinal direction 190 out of the coupler 100, thereby uncoupling the trough member 300A from the coupler 100.

The other locking elements 107A, 107C, and 107D function in a manner similar to that of the locking element 107B illustrated.

IV. Method of Use

An example method for coupling one or more trough members to the coupler 100 in accordance with the present invention is as follows. The locking elements 107A, 107B, 107C, and 107D may be in the unlocked or locked position. The terminal end 302 of the trough member 300A may be inserted into the coupler 100, thereby causing the spring 210A and spring release 220A portions of each locking element 107A, 107B, 107C, and 107D to be received in the slots 310 of the trough member 300A. The angled shape of the spring arms 211 and 212 of each spring is angled toward the direction of insertion of the terminal end 302 of the trough member 300A to allow the trough member 300A to be inserted with little resistance from the spring.

With the trough member 300A fully inserted into the coupler 100 and the locking elements in the locked position, the spring arms 211 and 212 of each spring push against opposing portions 315 and 316 of each slot 310. Removal of the trough member 300A is resisted by the angled shape of the arms 211 and 212 and ends of the arms grasping or embedding into the opposing portions 315 and 316 of the trough member 300A. The second trough member 300B may be coupled to the second coupler end 111 of the coupler 100 in a similar manner.

An example method of removing the trough member 300A in accordance with the present invention includes sliding the spring release 220A of each locking element to the unlocked position, thereby removing the pushing force of the spring arms 211 and 212 from the opposing portions 315 and 316 of the slots 310. The trough member 300A may then be removed. The second trough member 300B may be removed in a similar fashion.

Alternative embodiments to those provided herein are also possible. For example, it is possible to alter the configuration of the engagement between the locking elements and the slots on the trough members. For example, it may only be necessary to provide a spring with a single spring arm that engages an opposing portion (e.g., a flange) of the trough. In addition, a separate fastener, such as a screw, could also be used in combination with the locking elements.

The coupler 100 and trough members 300, 300A, and 300B are presented herein by way of example only, and other configurations are possible. For example, a coupler may be configured to be coupled to more than two trough members, therefore including more than the first and second coupler ends. Further, a greater number of locking elements and/or springs may be presented for each coupler end, or, alternatively, fewer locking elements and/or springs, for example, one, may be used.

IV. Alternative Locking Element

Referring now to FIGS. 24–40, another example embodiment of a locking element 400 is shown. The locking element 400 is similar to the locking elements 107A–107D described above, with the noted differences.

The locking element 400 generally includes a main body 401, springs 410A and 410B, spring releases 420A and 420B, and a clip 408. The springs 410A and 410B are configured and function in a manner similar to springs 210A and 2101B.

Figure 27:
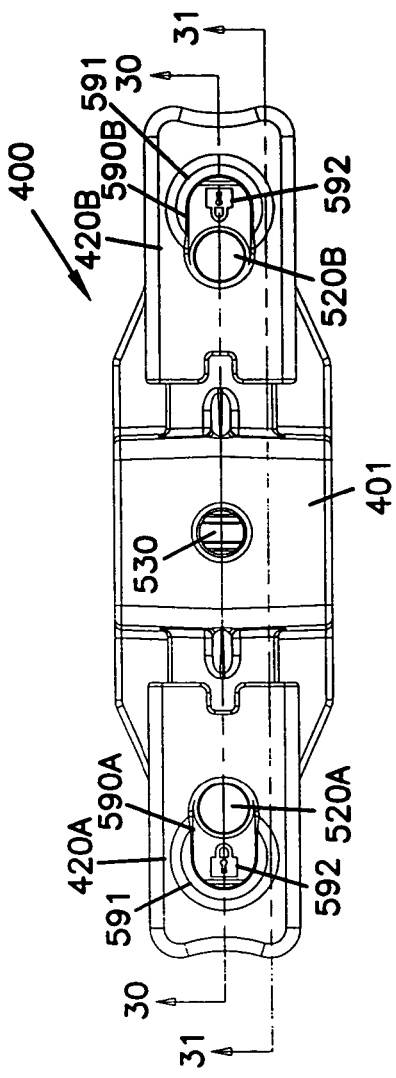
FIG. 27 is a top view of the locking element shown in FIG. 24 in a locked position.
Figure 30:
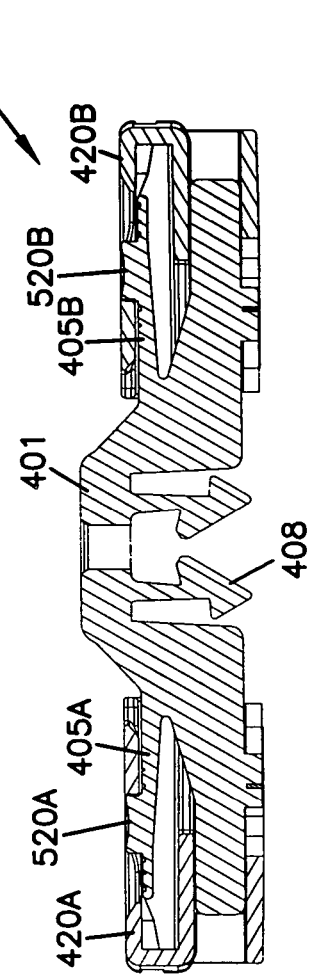
FIG. 30 is a cross-sectional side view along line 30—30 of FIG. 27.
Figure 31:
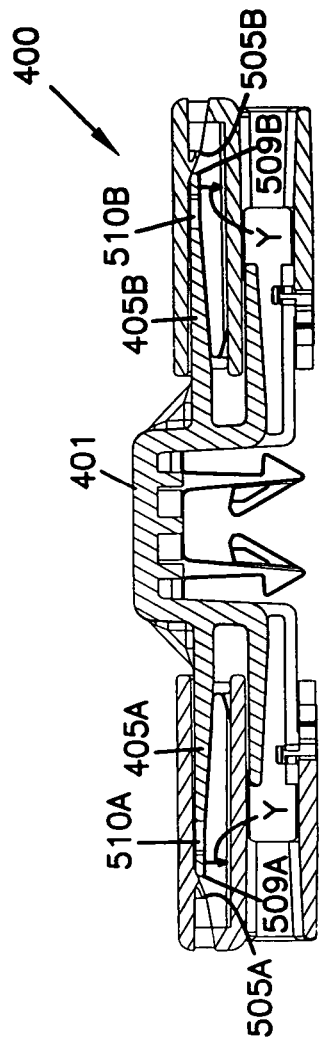
FIG. 31 is a cross-sectional side view along line 31—31 of FIG. 27.

The spring releases 420A and 420B include first ramps 505A and 505B (see FIGS. 30, 31, 33, and 34). The spring releases 420A and 420B also include second ramps (not shown) positioned generally opposite to the first ramps 505A and 505B and configured in a similar manner. The main body 401 includes railways 405A and 405B that define notches 510A, 512A and 510B, 512B (see FIGS. 35–40). In the locked position (as shown in FIGS. 27, 30, and 31), the first ramps 505A and 505B (as well as the second ramps) of the spring releases 420A and 420B are positioned beyond ends 509A and 509B of the railways 405A and 405B.

The railways 405A and 405B also include buttons 520A and 520B positioned to extend through apertures 590A and 590B defined in the spring releases 420A and 420B. The apertures 590A and 590B are sized to allow the spring releases 420A and 420B to slide along the railways 405A and 405B. The spring releases 420A and 420B also include recesses 591 positioned adjacent a portion of the apertures 590A and 590B to allow for greater access to the buttons 520A and 520, as described further below. The railways 420A and 420B also include indicators 592 and 593 to indicate whether each spring release 420A and 420B of the locking element 400 is in the locked or unlocked position. In the example embodiment shown, the indicators 592 and 593 are pictorial (showing a padlock in the locked and unlocked positions). However, other visual indicators, such as alpha-numeric wording or colors could also be used.

As the spring releases 420A and 420B are slid towards the unlocked position, the first ramps 505A and 505B (as well as the second ramps) engage the ends 509A and 509B of the railways 405A and 405B, push the railways 405A and 405B generally in a direction Y (see FIGS. 31 and 40), and generally travel along the railways 405A and 405B.

Figure 32:
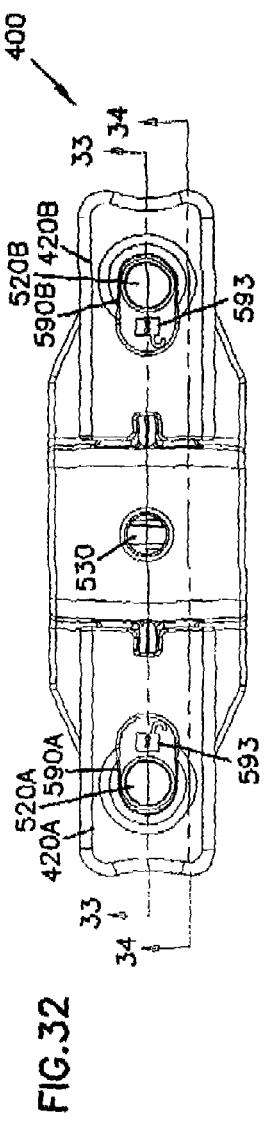
FIG. 32 is a top view of the locking element shown in FIG. 24 in an unlocked position.
Figure 33:
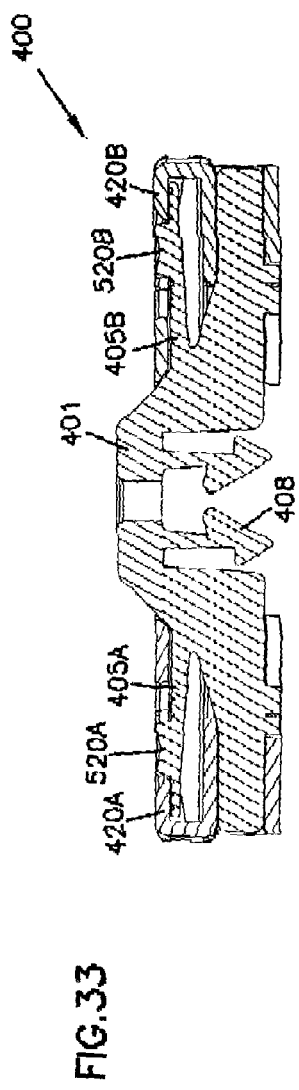
FIG. 33 is a cross-sectional side view along line 33—33 of FIG. 32.
Figure 34:
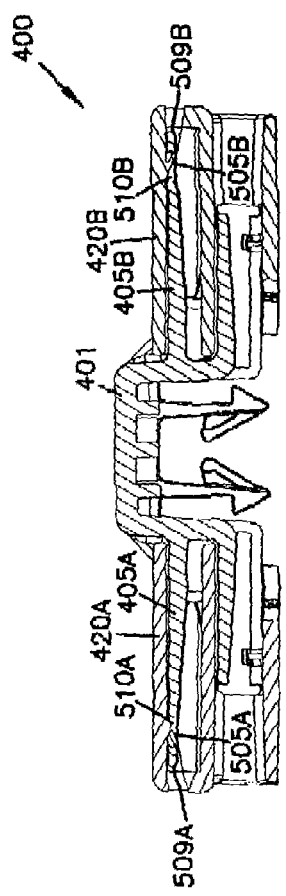
FIG. 34 is a cross-sectional side view along line 34—34 of FIG. 32.
Figure 39:
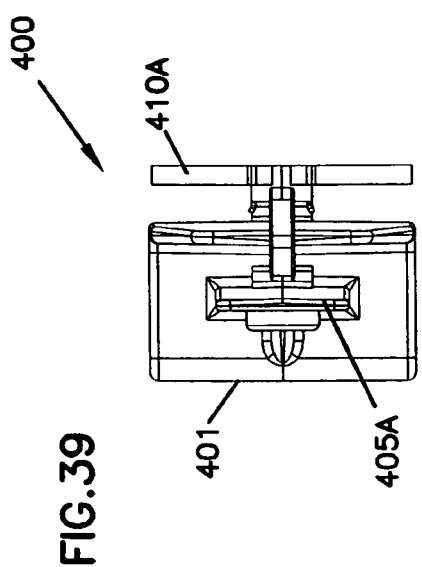
FIG. 39 is an end view of the locking element shown in FIG. 35.
Figure 35:
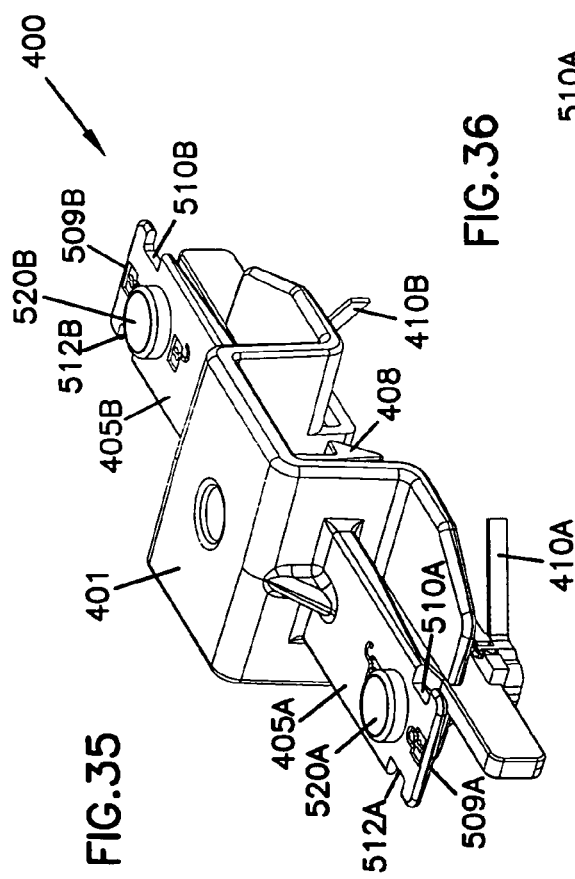
FIG. 35 is a perspective view of the locking element shown in FIG. 24 with the spring releases removed.
Figure 36:
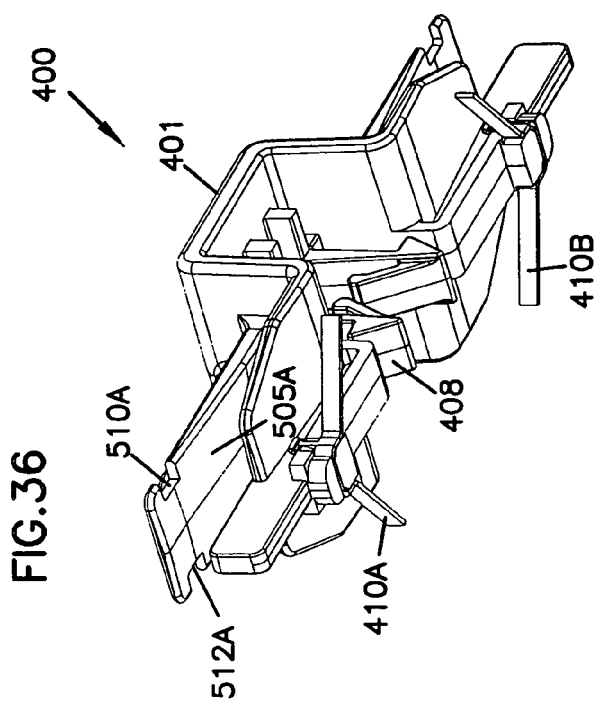
FIG. 36 is another perspective view of the locking element shown in FIG. 35.

Once the first ramps 505A and 505B (as well as the second ramps) have traveled over the ends 509A and 509B of the railways 405A and 405B, the ramps are received in the notches 510A, 512A and 510B, 512B, respectively, and the railways 405A and 405B are allowed to move back in a direction opposite to the direction Y. In this position (as shown in FIGS. 32–34), the ramps are held within the notches, and the spring releases 420A and 420B are retained in the unlocked position.

When it is necessary to move the spring releases 420A and 420B back to the locked position, one or both buttons 520A and 520B disposed on the railways 405A and 405B may be pushed, thereby causing the railways 405A and/or 405B to move generally in the direction Y and the first ramps 505A and 505B (as well as the second ramps) to disengage from the notches 510A, 512A and 510B, 512B. In this configuration, the spring releases 420A and 420B are free to move back to the locked position (as shown in FIGS. 27, 30, and 31).

Figure 41:
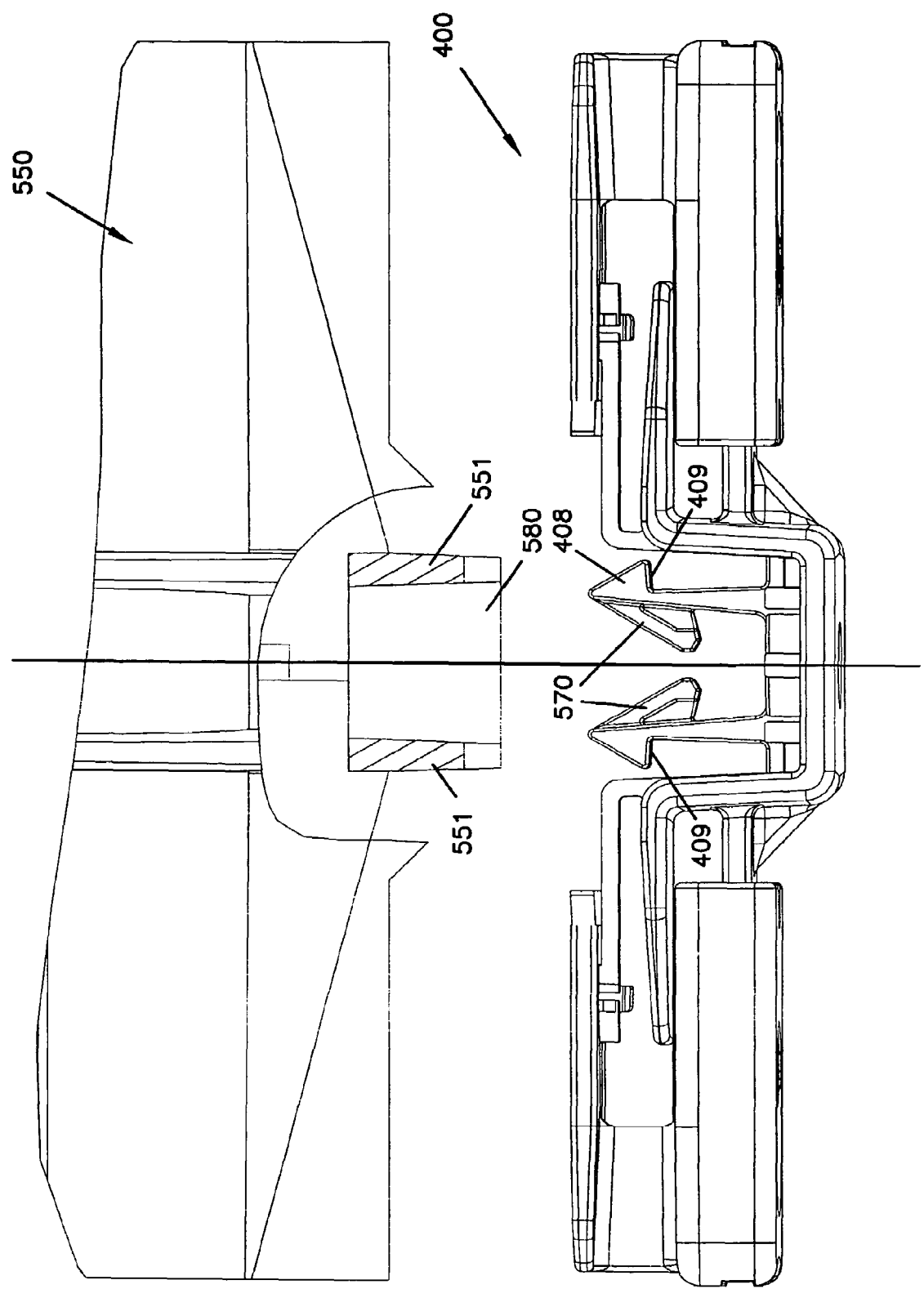
FIG. 41 is a side, partial cross-sectional view of the locking element of FIG. 24 detached from a coupler.
Figure 42:
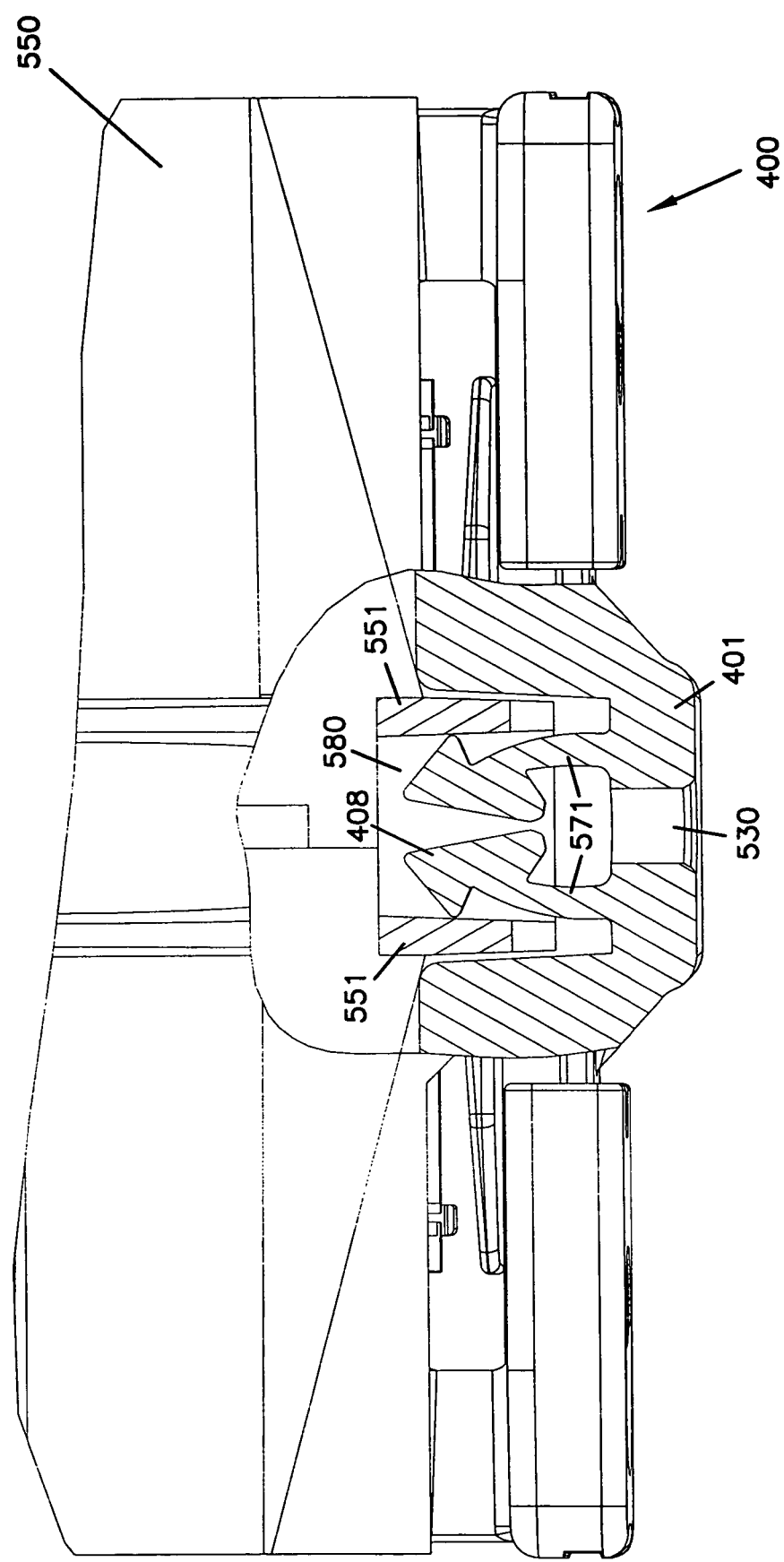
FIG. 42 is a side, partial cross-sectional view of the locking element of FIG. 41 partially inserted into the coupler.
Figure 43:
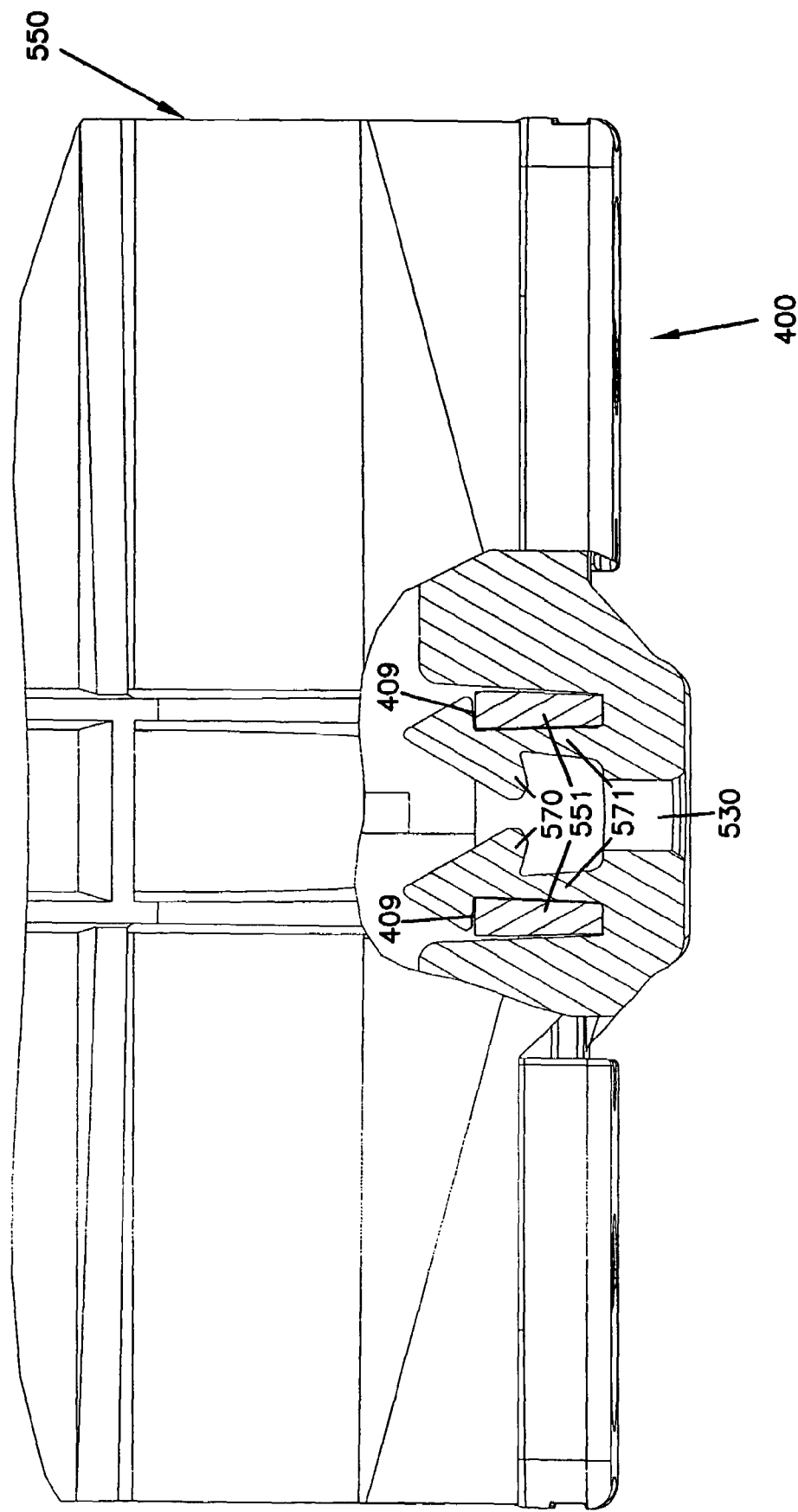
FIG. 43 is a side, partial cross-sectional view of the locking element of FIG. 41 fully inserted into the coupler.

Referring now to FIG. 41, the locking element 400 and a coupler 550 are shown positioned adjacent to one another to illustrate how the locking element 400 may be coupled to the coupler 550. Referring now to FIG. 42, the clip 408 of the locking element 400 may be inserted into an aperture 580 defined by shoulders 551 of the coupler 550. As the clip 408 is pushed through the aperture 580, the clip 408 is compressed so that arms 571 of the clip 408 move towards one another. Referring now to FIG. 43, the clip 408 of the locking element 400 is shown fully inserted and coupled to the coupler 550. Detents 409 on the ends of the arms 571 engage the shoulders 551 of the coupler 550 to retain the locking element 400 on the coupler 550.

Figure 44:
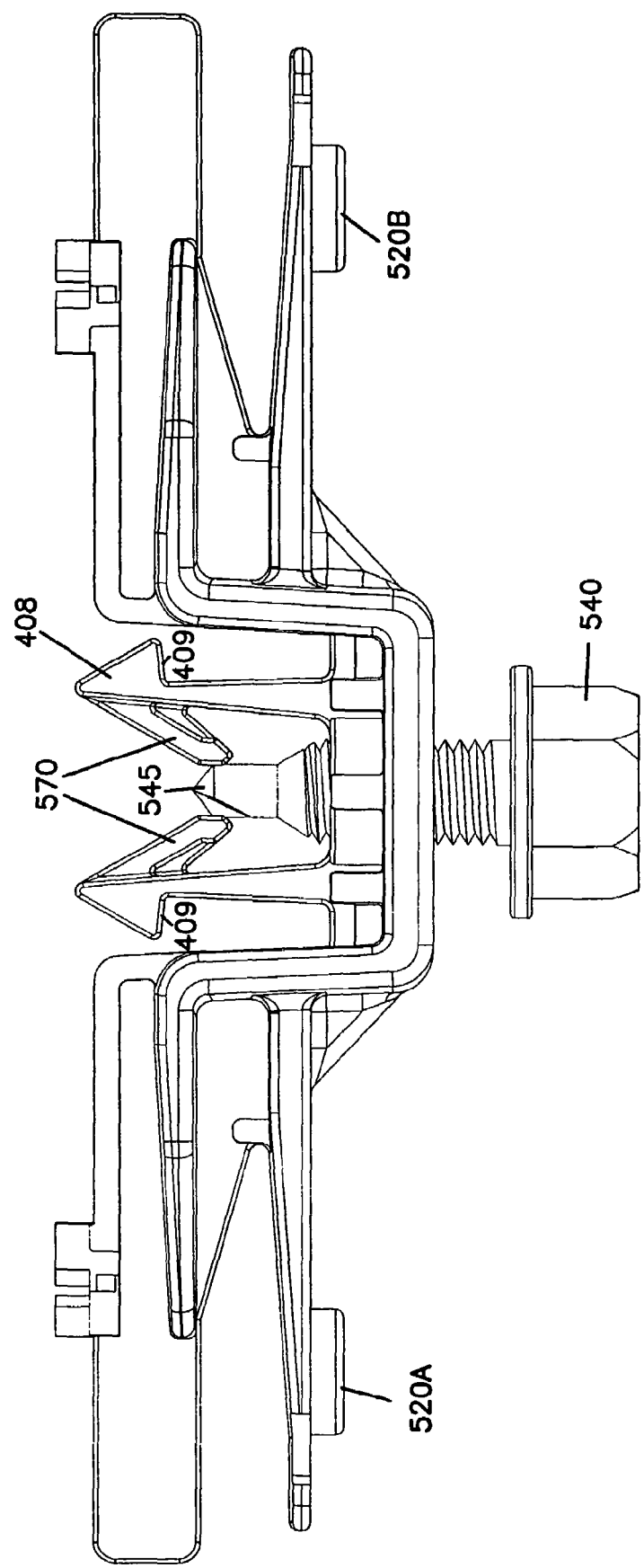
FIG. 44 is a side view of the locking element shown in FIG. 24 with the spring releases removed and including an attaching element.

The locking element 400 also includes an hole 530 defined in the main body 401. As shown in FIG. 44, the hole 530 is configured to receive an attaching element 540. In the example embodiment shown, the attaching element 540 is a screw, although other attaching elements such as bolts, rivets, or other fasteners may be used. An end 545 of the attaching element 540 extends through the hole 530.

Figure 45:
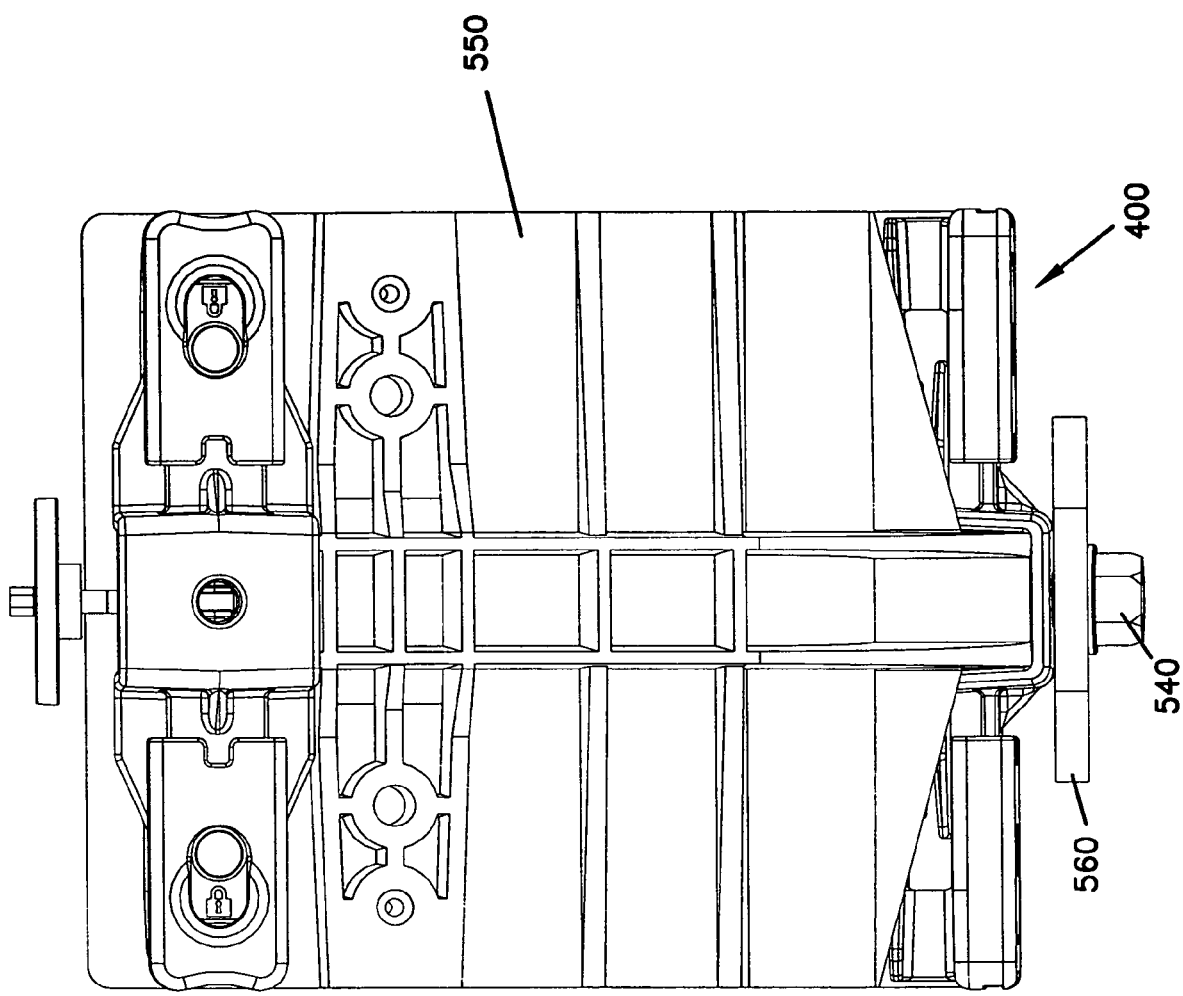
FIG. 45 is a side view of the locking element shown in FIG. 24 coupled to a coupler and to a mounting bracket.
Figure 46:
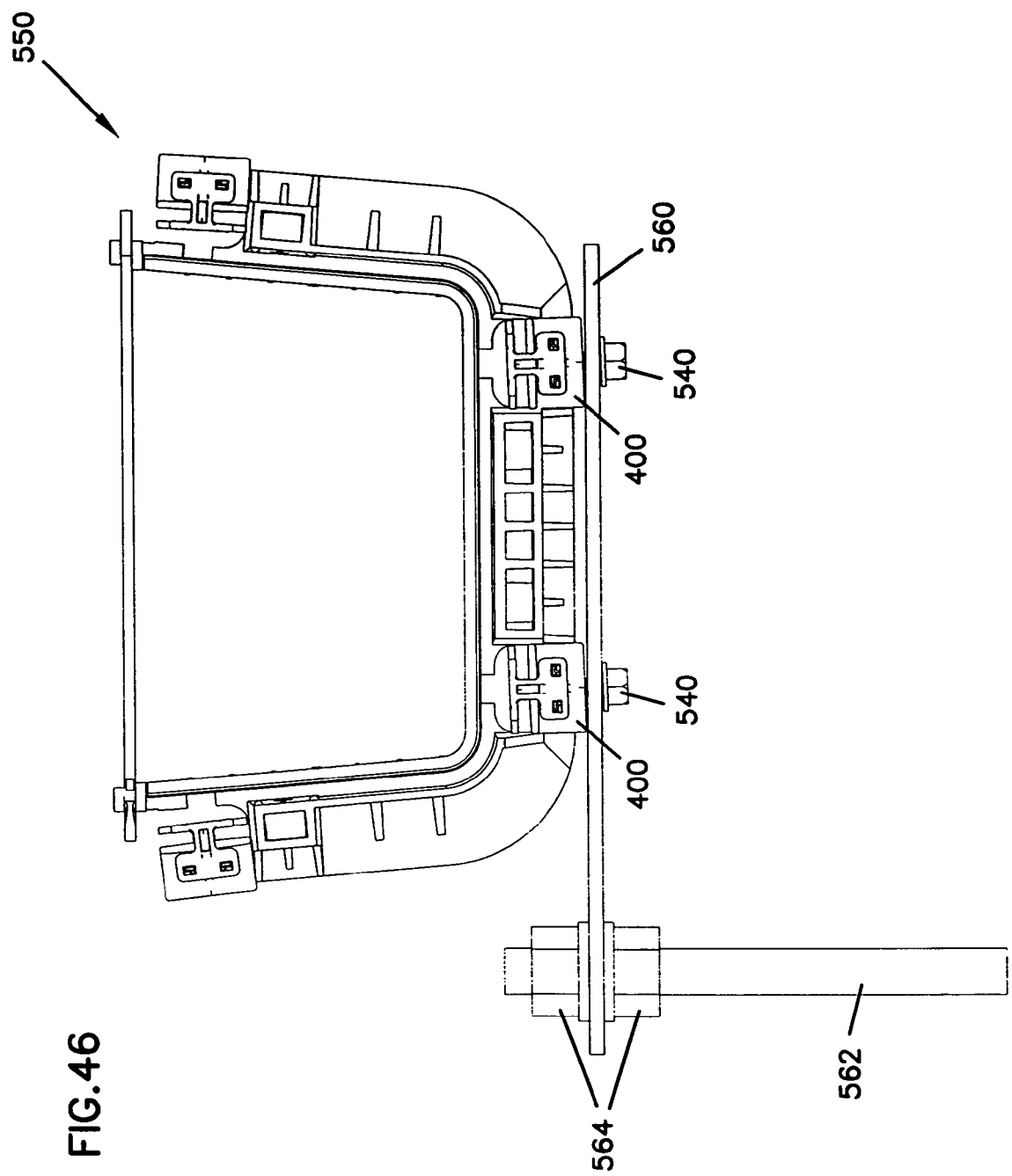
FIG. 46 is a front view of the locking element, coupler, and mounting bracket shown in FIG. 45.
Figure 47:
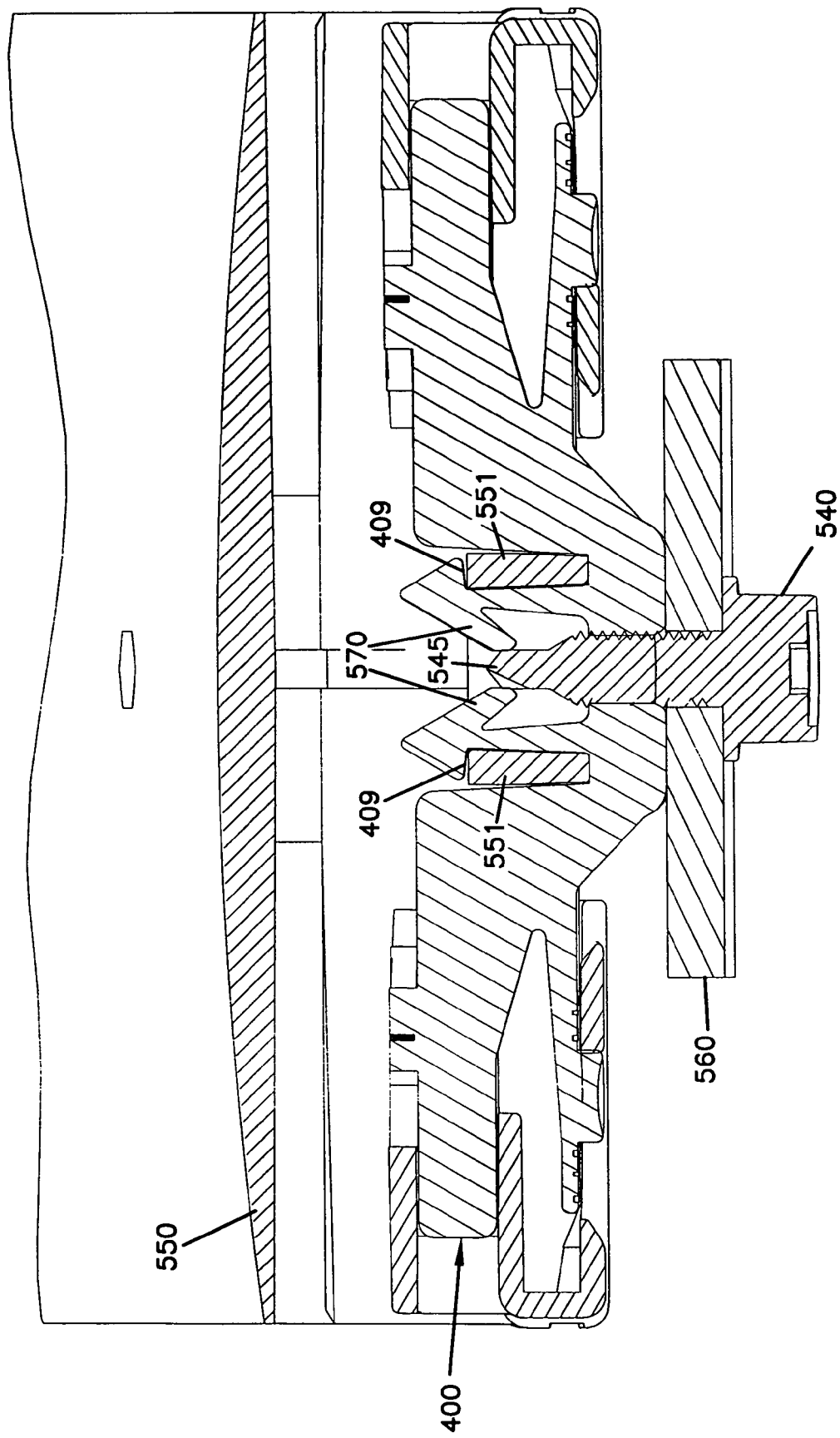
FIG. 47 is a cross-sectional view along line 47—47 showing a portion of the locking element, coupler, and mounting bracket shown in FIG. 45.

Referring now to FIGS. 45–47, the locking element 400 is shown coupled to a coupler 550 by the clip 408. In addition, a mounting bracket 560 is coupled to the coupler 550 by the attaching element 540. The mounting bracket 560 may generally be any structure used to hold a trough system in place. For example, as shown in FIG. 46, the mounting bracket 560 may be formed in various shapes to position the coupler 550 as desired. The mounting bracket 560 may, in turn, be coupled to a support structure located above, below, or adjacent to the coupler 550. In the example embodiment shown, the mounting bracket 560 is part of a threaded rod bracket kit including threaded rod 562 and nuts 564. Other configurations are possible.

As illustrated, the attaching element 540 may be used to couple the mounting bracket 560 to the coupler 550. In addition, the end 545 of the attaching element 540 may engage knobs 570 extending from the arms 571 in a direction opposite to detents 409 on the clip 408. The end 545 of the attaching element 540 is positioned so that the arms 571 of the clip 408 are not allowed to move towards one another (as shown in FIG. 42). Therefore, the locking element 400 may be further retained on the coupler 550.

The above specification, examples and data provide a complete description of the manufacture and of the invention. Since many embodiments of the invention can be made without departing from the spirit and scope of the invention, the invention resides in the claims hereinafter appended.

What is claimed is:

1. A coupler for a cable trough system, the coupler comprising:
a body including a bottom wall and two side walls defining a trough, the body having a body terminal end defining an overlap region, the overlap region being sized to slideably receive a terminal end of a trough member along a longitudinal direction of the body;
a locking element including a spring and a spring release mechanism, the spring including first and second spring arms extending generally in opposition to one another in a plane generally parallel to the longitudinal direction, the spring release mechanism including first and second fingers configured to slide in the longitudinal direction between a locked position, such that the first and second spring arms engage the terminal end of the trough member, and an unlocked position, such that the first and second fingers disengage the first and second spring arms from the terminal end of the trough member, and the locking element defining a hole, wherein the locking element further includes a clip to couple the locking element to the body of the coupler, the clip including first and second arms with detents formed on ends of each of the arms to engage the body of the coupler; and
a fastener extending through the hole in the locking element, wherein the fastener is positioned to maintain the first and second arms of the clip in a direction generally away from one another so that the locking element is retained on the body.

2. The coupler of claim 1, wherein the fastener is a screw.

3. The coupler of claim 1, wherein the spring release mechanism is forced by the spring into the locked position.

4. A coupler for a cable trough system, the coupler comprising:
a body including a bottom wall and two side walls defining a trough, the body having a body terminal end defining an overlap region, the overlap region being sized to slideably receive a terminal end of a trough member along a longitudinal direction of the body;
a locking element including a spring and a spring release mechanism, the spring including first and second spring arms extending generally in opposition to one another in a plane generally parallel to the longitudinal direction, wherein the spring release mechanism includes first and second fingers configured to slide in the longitudinal direction between a locked position, such that the first and second spring arms engage the terminal end of the trough member, and an unlocked position, such that the first and second fingers disengage the first and second spring arms from the terminal end of the trough member, and wherein the locking element defines a hole; and
a fastener extending through the hole in the locking element to couple the locking element to the body of the coupler.

5. The coupler of claim 4, wherein the first and second fingers compress the first and second spring arms toward one another when the spring release mechanism is in the unlocked position.

6. A coupler for a cable trough system, the coupler comprising:
a body including a bottom wall and two side walls defining a trough, the body having a body terminal end defining an overlap region, the overlap region being sized to slideably receive a terminal end of a trough member along a longitudinal direction of the body;
a locking element including a spring and a spring release mechanism, the spring including first and second spring arms extending generally in opposition to one another in a plane generally parallel to the longitudinal direction, the spring release mechanism including first and second fingers configured to slide in the longitudinal direction between a locked position, such that the first and second spring arms engage the terminal end of the trough member, and an unlocked position, such that the first and second fingers disengage the first and second spring arms from the terminal end of the trough member, and the locking element defining a hole, wherein the locking element further includes a main body including a railway on which the spring release mechanism slides, the railway defining a notch and the spring release mechanism including a ramp such that, as the spring release mechanism is slid from the locked position to the unlocked position, the ramp pushes the railway and engages the notch to hold the spring release mechanism in the unlocked position; and
a fastener extending through the hole in the locking element to couple the locking element to the body of the coupler.

7. The coupler of claim 6, wherein the railway is moveable so that the notch can clear the ramp to allow the spring release mechanism to slide from the unlocked to the locked position.

8. A coupler for a cable trough system, the coupler comprising:
a body including a bottom wall and two side walls defining a tough, the body having a first body terminal end defining an overlap region, the overlap region being sized to slideably receive a terminal end of a trough member along a longitudinal direction of the body;
a locking element including a first spring and a spring release mechanism, the first spring including first and second spring arms extending generally in opposition to one another in a plane generally parallel to the longitudinal direction, the spring release mechanism including first and second fingers configured to slide in the longitudinal direction between a locked position, such that the first and second spring arms engage the terminal end of the trough member, and an unlocked position, such that the first and second fingers disengage the first and second spring arms from the terminal end of the trough member, and the locking element defining hole;

a fastener extending through the hole in the locking element to couple the locking element to the body of the coupler;

a second body terminal end defining a second overlap region, the second overlap region being sized to slideably receive a terminal end of a second trough member along the longitudinal direction of the body; and a second spring coupled to the body for securing the terminal end of the second trough member to the coupler, the second spring including first and second spring arms extending generally in opposition to one another in a plane generally parallel to the longitudinal direction.

9. A coupler for a cable trough system, the coupler comprising:

a body including walls defining a bottom wall and two side walls defining a trough, the body having a body terminal end defining an overlap region, the overlap region being sized to slideably receive a terminal end of a trough member along a longitudinal direction of the body;

a spring including first and second spring arms extending at an angle with respect to one another; and a locking element coupled to the body and including a main body with a railway on which a spring release mechanism including first and second fingers slides, the locking element including an unlocked position, in which the spring release mechanism is held by the locking element in engagement with the spring, such that the first and second fingers disengage the first and second spring arms from the terminal end of the trough member and a locked position, in which the spring release mechanism slides along the railway in the longitudinal direction to release the spring such that the first and spring arms engage the terminal end of the trough member has been inserted.

10. The coupler of claim 9, wherein the railway defines a notch and the spring release mechanism includes a ramp such that, as the spring release mechanism is slid from the locked position to the unlocked position, the ramp pushes the railway and engages the notch to hold the spring release mechanism in the unlocked position.

11. The coupler of claim 9, wherein the railway is moveable so that the notch can clear the ramp to allow the spring release mechanism to slide from the unlocked to the locked position.

12. The coupler of claim 10, wherein the railway defines a button that extends through an aperture defined by the spring release mechanism, the button allowing the notch on the railway to be depressed when the button is pushed.

13. The coupler of claim 9, wherein the notch is a first notch and the railway defines a second notch, the first and second notches being positioned generally opposing one another, and wherein the ramp is a first ramp and the spring release mechanism includes a second ramp, the first and second ramps positioned to engage the first and second notches, respectively, when the spring release mechanism is in the unlocked position.

14. The coupler of claim 9, wherein the locking element further includes a clip whereby the locking element is coupled to the body, and the locking element defines a hole configured to receive an attaching element that is used to couple the body to a mounting bracket, wherein the clip includes first and second arms with detents formed on ends of each of the arms to engage the body of the coupler, and wherein the attaching element is positioned so that, as the attaching element extends through the hole in the spring release mechanism, the attaching element engages and pushes the first and second arms in a direction generally away from one another so that the locking element is retained on the body.

* * * * *

UNITED STATES PATENT AND TRADEMARK OFFICE
CERTIFICATE OF CORRECTION

PATENT NO.         : 7,029,195 B2
APPLICATION NO. : 10/777669
DATED                : April 18, 2006
INVENTOR(S)        : Nault et al.

It is certified that error appears in the above-identified patent and that said Letters Patent is hereby corrected as shown below:

TITLE PAGE, (56) References Cited, PAGE TWO Foreign Patent Documents:
"EP  0 84 260 A1  10/1998" should read --EP 0 874 260 A1  10/1998--

Col. 7, line 7: "of the spring 2101B." should read --of the spring 210B.--

Col. 12, line 56, claim 8: "defining a tough, the" should read --defining a trough, the--

Col. 14, line 2, claim 9: "trough member has been inserted." should read --trough member.--

Signed and Sealed this

Nineteenth Day of September, 2006

JON W. DUDAS
*Director of the United States Patent and Trademark Office*